(12) United States Patent
Garvey

(10) Patent No.: US 7,485,994 B2
(45) Date of Patent: Feb. 3, 2009

(54) MAGNETIC BEARINGS

(75) Inventor: Seamus Dominic Garvey, Nottingham (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 11/876,172

(22) Filed: Oct. 22, 2007

(65) Prior Publication Data

US 2008/0100162 A1    May 1, 2008

Related U.S. Application Data

(63) Continuation of application No. 10/332,605, filed as application No. PCT/GB01/03129 on Jan. 10, 2003, now Pat. No. 7,301,252.

(30) Foreign Application Priority Data

| Jul. 13, 2000 | (GB) | ................... | 0017122.3 |
| Jul. 21, 2000 | (GB) | ................... | 0017799.8 |
| Jul. 21, 2000 | (GB) | ................... | 0017834.3 |
| Sep. 26, 2000 | (GB) | ................... | 0023500.2 |
| Jan. 10, 2001 | (GB) | ................... | 0100705.3 |

(51) Int. Cl.
    *H02K 7/09*    (2006.01)
(52) U.S. Cl. .................................. 310/90.5
(58) Field of Classification Search .............. 310/90.5
    See application file for complete search history.

(56) References Cited

U.S. PATENT DOCUMENTS

| 1,544,586 A | 7/1925 | Mills |
| 2,582,788 A | 1/1952 | Mendelsohn |
| 2,747,944 A | 5/1956 | Baermann |
| 3,779,618 A | 12/1973 | Soglia et al. |
| 3,937,148 A | 2/1976 | Simpson |
| 3,937,533 A | 2/1976 | Veillette |
| 4,620,752 A | 11/1986 | Fremerey et al. |
| 4,644,205 A | 2/1987 | Sudo et al. |
| 5,043,615 A | 8/1991 | Oshima et al. |
| 5,126,610 A | 6/1992 | Fremerey et al. |
| 5,153,475 A | 10/1992 | McSparran |
| 5,177,387 A | 1/1993 | McMichael et al. |
| 5,218,257 A | 6/1993 | Tozoni |
| 5,225,728 A | 7/1993 | Oshima et al. |
| 5,256,638 A | 10/1993 | Weinberger et al. |
| 5,386,166 A | 1/1995 | Reimer et al. |

(Continued)

FOREIGN PATENT DOCUMENTS

EP    0098002    1/1984

(Continued)

*Primary Examiner*—Burton Mullins
(74) *Attorney, Agent, or Firm*—Goodwin Procter LLP

(57) ABSTRACT

A magnetic bearing has two bearing members each of which carries a set of bearing elements. The bearing elements carried by one member are interleaved with the bearing elements carried by the other member to define three or more substantially parallel interleaf gaps between successive elements, so that bearing forces can be developed as a result of magnetic shear stresses acting across those gaps. The magnetic bearing achieves its bearing forces as the sum of force contributions from a number of parallel (or nearly-parallel) airgaps and each of these individual airgap force contributions comes about as the integration of magnetic shear stress over the airgap area brought about by causing lines of magnetic flux to cross the airgap at an angle to the normal.

14 Claims, 30 Drawing Sheets

U.S. PATENT DOCUMENTS

| | | |
|---|---|---|
| 5,440,997 A | 8/1995 | Crowley |
| 5,729,065 A | 3/1998 | Fremery et al. |
| 5,789,837 A | 8/1998 | Shin et al. |
| 5,847,480 A | 12/1998 | Post |
| 5,952,744 A | 9/1999 | Chitayat |

FOREIGN PATENT DOCUMENTS

| | | | |
|---|---|---|---|
| JP | 53115435 | | 10/1978 |
| JP | 57065413 | * | 4/1982 |
| JP | 01279116 | * | 11/1989 |
| WO | WO-92/15795 | | 9/1992 |

* cited by examiner

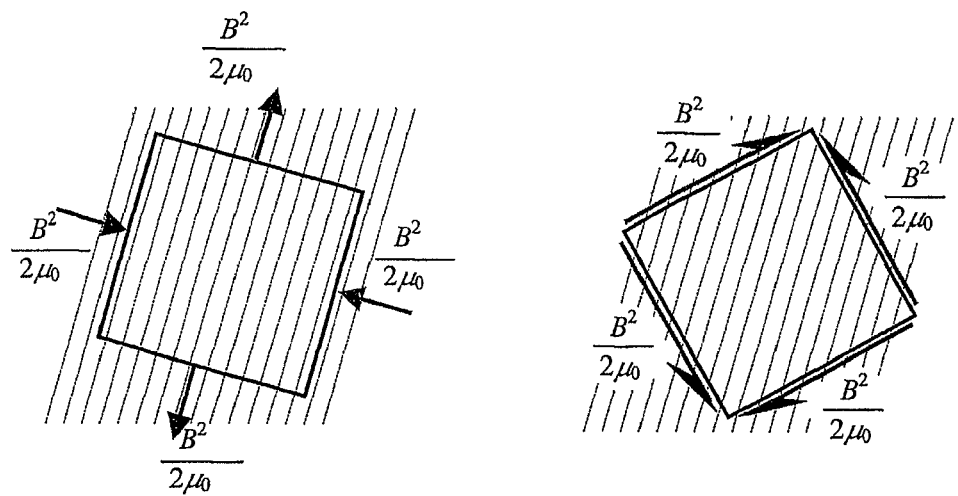
Fig 7a
Fig 7b
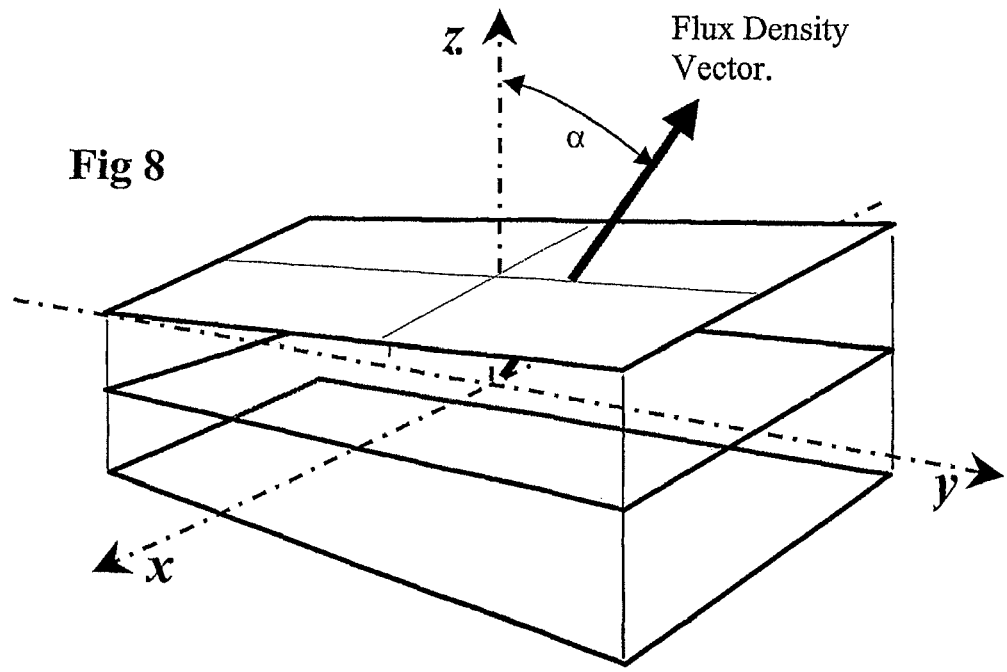
Fig 8

MAGNETIC BEARINGS

This application is a continuation of U.S. application Ser. No. 10/332,605, filed Jul. 11, 2001, which is a national stage application of PCT/GB01/03129, filed July 11, 2001. This application also claims priority to and the benefit of, U.K. Patent Application Serial Nos. GB 0017122.3, filed Jul. 13, 2000; GB 0017799.8, filed July 21, 2000; GB 0017834.3, filed Jul. 21, 2000; GB 0023500.2, filed Sep. 26, 2000; and GB 0100705.3, filed January 10, 2001, the entire disclosures of which are hereby incorporated by reference herein.

FIELD OF THE INVENTION

This invention relates to magnetic bearings, both passive and active magnetic bearings, and particularly, but not exclusively, to compact, high-stiffness and high load capacity magnetic bearings.

BACKGROUND TO THE INVENTION

Magnetic Bearings: Purposes and Attributes.

The purpose of a magnetic bearing is to provide a force between two major bearing members without contact occurring. This force is subsequently referred to as the bearing force. Consistent with the normal definition of any bearing, a magnetic bearing allows free motion in one or more senses whilst providing the capability for exerting bearing forces in at least one other sense. Most magnetic bearings are employed in rotating machines to separate the rotor and the stator. Magnetic bearings have the advantages of very low energy loss rate (given proper design), no contact between parts giving potentially very long life, and the ability to withstand relatively high temperatures.

Magnetic bearings may be active or passive. Active magnetic bearings sense the relative position of the two major bearing members. They then adjust the electric currents in coils such that the net force between the two major bearing members has the appropriate magnitude and direction. Passive magnetic bearings usually involve magnetic fields from permanent magnets but they may alternatively be constructed using coils of conductor to provide the magnetomotive force (MMF). The electric currents flowing in these coils are not, however, a strong function of the relative position of the two bearing members. Passive magnetic bearings often operate on the basis of repulsion of like poles.

In a simple view, active magnetic bearings may be arbitrarily stiff in the sense that the smallest amount of relative movement between the two major bearing members can be made to cause a finite amount of force. There are obviously limitations to this associated with the ability to sense extremely small motions and the need for the closed-loop control system to be stable. However, it is broadly accepted that active bearings are generally orders of magnitude more stiff than their passive equivalents. Stiffness of a bearing is extremely important for acceptable dynamic properties and in order that the relative position of the two major bearing members is insensitive to the externally-applied load existing between them.

Another extremely important attribute of any bearing is reliability. Active magnetic bearings are complicated systems involving sensing, control, and power-currents. As such, there are very many possible modes of failure other than straightforward mechanical breakage. By contrast, passive bearings tend to be extremely robust and reliable with very few modes of possible failure other than mechanical breakage.

A key attribute of any magnetic bearing is size. A second related and equally important attribute is total weight. It is generally accepted that for a given force rating, a radial magnetic bearing is many times larger than its rolling-element counterpart.

Elementary Bearing Regions and the Central Surface.

Consider bearings which comprise two major bearing members between which some free relative motion is to be provided. In many cases, at least one of the free relative motions is a rotation. The rotation of any physical body of a scale above atomic scale involves translation of the particles at the surface of that body. To provide a bearing which can offer forces to resist relative motions of the two major bearing members in some senses and yet allow free rotation about some axis, it is both necessary and sufficient to provide regions within the bearing where translation is opposed along at least one axis and free along at least one other axis. Such regions are referred to as elementary bearing regions.

The conventional ball bearing is useful for illustration. This bearing contains a finite number of elementary bearing regions—one per ball—where relative translation of the inner race and the outer race is stiffly resisted along one direction and where translation of the inner race and outer race is free in the other two directions. The stiff direction for each individual ball at a given instant is along the (ball) diameter between contacts. This simple conceptual model obviously ignores friction and viscous shear forces at the contacts. FIG. 1 illustrates the elementary bearing region of a ball bearing.

The collective action of all of these elementary bearing regions in the case of a ball bearing results in a bearing which provides free rotation about one axis but reacts against all net translations between the two major bearing members and (for an angular contact ball bearing) against the rotations about the other two orthogonal axes of rotation.

A similar view can be taken of a cylindrical roller bearing. Each roller can produce very stiff opposition to relative translations of the inner and outer race in one direction. It will allow very free movement in the direction of rolling. It provides some resistance to relative movement of the inner and outer races in the axial direction although this resistance is not usually used. For cylindrical roller bearings, we can consider that there is one elementary bearing region for each individual roller. For roller bearings having conical rollers, consider each roller to comprise a large number of disc-like slices and the elementary bearing regions are revealed. FIG. 2 illustrates an elementary bearing region from a conical roller bearing.

It is straightforward to extend this view of all bearings which accommodate rotation to hydrostatic and hydrodynamic bearings. In the case of hydrostatic bearings, the elementary bearing regions can be regarded as the individual locations where pressurised fluid is fed into the cavity between the two major bearing members. FIG. 3 depicts an elementary bearing region from a hydrostatic bearing, showing, superimposed, a pressure distribution over such a location. In the case of hydrodynamic bearings, the lubricant interlayer between the two major bearing members can be decomposed into patches each of which exerts some force to maintain a distance between the two major bearing members. FIG. 4 illustrates one such patch, and the direction of relative motion between the bearing members.

Following the above logic, all bearings can be decomposed into sets of elementary bearing regions having at least one direction of comparatively free relative translation and at least one direction in which translation is (or can be) strongly opposed.

In each of the above examples of bearings, the elementary bearing regions include a portion of the surface of each of the two major bearing members. Between these two surfaces, there is a central surface. This is any smooth surface such that the action of the bearing region in providing a direction of free translation can be considered to be equivalent to sliding of one side of this central surface relative to the other. The term central surface is used regularly throughout the remainder of this document.

In most cases, the elementary bearing regions are only (or predominantly) used to provide free translation in one direction. This direction is in the plane of the central surface. Thus, it is possible to establish an axis set of principal directions for an elementary bearing region according to FIG. 5 in which the three axes are:

(1) The axis of (predominant) free relative translation. For obvious practical reasons, the free relative translation is similar to a discrete pure shearing action at the central surface. This direction is arbitrarily labelled x in FIG. 5.
(2) The axis normal to the central surface. This direction is arbitrarily labelled z in FIG. 5.
(3) The remaining orthogonal axis, labelled direction y in FIG. 5.

In all of the above cases, the force acting between the two surfaces of the two major bearing members is predominantly along the normal to the central surface i.e. along the z direction of FIG. 5.

No practical bearing at scales above atomic scales is truly lossless. There is some rolling resistance in ball and roller bearings. There is some viscous drag in the bearing fluids in hydrostatic and hydrodynamic bearings. There are eddy-current losses and hysteresis losses in magnetic bearings. Thus, in all cases, there is invariably some component of force acting to oppose the relative translation of the two surfaces in the "free" direction, x.

Magnetic Stresses in Magnetic Bearings

Many existing designs of magnetic bearings rely squarely on the fact that where magnetic flux is caused to pass through air, there is effectively a tensile Maxwell stress in the air in the direction of the lines of magnetic flux. Most, if not all, active magnetic bearings currently available operate directly on the basis of this tensile stress.

FIG. 6 illustrates the action of the tensile Maxwell stress in probably the simplest instance where a horse-shoe shaped permanent magnet drives a magnetic field through itself, an airgap (twice) and some second body. Because the lines of magnetic flux in this case are predominantly normal to the faces of the horse-shoe magnet and to the surface of the second body, it is possible to approximate the net force generated at each of the two airgap-crossings by a simple formula. These two discrete forces can then be combined using elementary trigonometry to produce an expression for the total resultant attractive force between the magnet and the second body.

The oldest designs of active magnetic bearing comprise separately-energised horse-shoe shaped electromagnets arranged about the circumference of an airgap with a solid (or hollow) cylindrical rotor in the centre. Each horse-shoe electromagnet has its own complete magnetic circuit and there is very little interaction between distinct electromagnets. In normal operation, each electromagnet has a bias field such that there is always some magnetic flux through the horse-shoe electromagnet. The bias field is sometimes provided by a DC component of current in the electromagnet but it can be provided by a permanent magnet in the magnetic circuit. The forces produced by the bias fields generally sum to near zero.

Then by introducing a relatively small amount of (additional) current in one horse-shoe electromagnet and the negative of this (additional) current in the horse-shoe electromagnet diametrically opposite, a net transverse force is created between the bearing stator and the bearing rotor.

Some more modern designs of magnetic bearing utilise stator shapes which are akin to the stators of switched-reluctance machines in that there are inwardly-protruding stator poles mounted onto a continuous cylinder of back-iron. There may be coils on individual stator poles or coils may link two or more poles. Alternatively coils may be formed around the back of core following the old Gram-ring winding method which was common in electrical machines some years ago. Permanent magnets may be provided in the stator poles or in the cylinder of back-iron to create the bias field. The relationship between individual currents in coils (or phases) and the quantity of magnetic flux passing through the individual stator poles is more complex in these cases than it is for the simple arrangement of multiple independent horse-shoe electromagnets. However the basic principle of operation is the same: attractive force per pole is (roughly) proportional to the square of total flux through the pole-face.

Most magneto-mechanical devices are fundamentally limited by flux density. It is very rare for flux densities in any iron-containing machine to rise above 2 Tesla anywhere in the iron because of saturation. (The word iron is used here to encompass any ferromagnetic material). Maximum flux density in a ferro-magnetic material is a key parameter in choosing such a material for an application but it is not the only one. Mechanical strength, stiffness, resistivity (for eddy-current losses) and low magnetic hysteresis effects are other properties that the designer must keep in mind when selecting a material for use in a magneto-mechanical device. Of course, there is ultimately no maximum magnetic flux density in iron or any other material but the (incremental) relative permeability for iron can fall from over 1000 at low flux levels to not much above 1 at flux levels over 2 Tesla.

Magnetic flux densities in the iron of an iron-carrying magneto-mechanical device are invariably higher than those in the airgaps where the magnetic flux is effective in generating force. The term airgap is used in this context to mean a region of space that may or may not be filled by a non-magnetic fluid. This usage is consistent with the interpretation of the term in the context of electrical machines. Most usually, the gap between relatively movable parts of the device is occupied by air.

Given that airgap flux density is limited, it follows that the Maxwell stresses achievable are also limited in magnitude. The net force or torque acting through an airgap can be computed by choosing any surface through that airgap and integrating the magnetic stresses over that surface. If this is done, an average effective airgap stress can be derived as the total force divided by the total airgap area or the total torque divided by the total first-moment of airgap area about the axis of rotation. The average airgap stress is limited to about 0.4 MPa.

In the context of the design of any magnetic bearing, a key requirement is to be able to develop a certain nominal force capable of resisting motion in one direction. Given that the effective airgap stress in any magneto-mechanical device is inherently limited by saturation of iron, it follows that there is a minimum operative area of airgap for a given rated load. One route taken by designers of magnetic bearings is to use relatively large flat bearing surface areas through which magnetic flux passes. Another route taken is to use relatively large-diameter/long bearing surfaces so that the requisite airgap area can be achieved in a finite length of shaft.

For a given magnetic flux density, B, in the airgap, the tensile Maxwell stress in the direction, "r", of the lines of flux is given by:

$$\sigma_{rr} = \frac{B^2}{2\mu_0}$$

A fact that is much neglected in the design of magnetic bearings is that in the two directions, "s" and "t", perpendicular to r there is effectively a compressive stress given by:

$$\sigma_{ss} = -\frac{B^2}{2\mu_0} = \sigma_{tt}$$

FIG. 7a shows a set of magnetic flux lines in a plane of constant t. The square box drawn in FIG. 7a can be considered to have tension, $\sigma_{rr}$, acting on two opposite faces and compression (negative tension), $\sigma_{ss}$, acting on the other two opposite faces. FIG. 7b shows the same set of magnetic flux lines in the same plane of constant t. A square box of the same size as that in FIG. 7a is drawn here also but the orientation of this square box is at 45° to the orientation of the box in FIG. 7a. In this figure, axes "u" and "v" are defined to occur at 45° angles to the direction of the magnetic flux. On the sides of this box, it is found that effectively a pure shear stress is acting with no component of normal stress. The magnitude of this pure shear stress "$\tau_{UV}$" (in FIG. 7b) is identical to the magnitude of the normal stresses on the sides of the box in FIG. 7a.

$$\tau_{ss} = \frac{B^2}{2\mu_0}$$

Returning to the discussion of elementary bearing regions, consider that lines of magnetic flux are passing between the two bounding surfaces of the elementary bearing region in FIG. 5 such that each flux line is (at least approximately) perpendicular to the x direction (the direction in which free relative motion of the two bounding surfaces is desired). Provided that this condition is satisfied, there will be component of force between the two major components in the x direction. If these lines of flux are parallel to the z direction (normal to the central surface), then the force between the two bounding surfaces will equal to the stress times the area, i.e. $B^2 A/2 \mu_0$ where B is the flux density and A is the area of the central surface.

If, as indicated in FIG. 8, the flux lines are all perpendicular to x and they lie at an angle α to the normal, Z, then there will be components of force between the two bounding surfaces of the elementary bearing region in directions y and z, given by:

$$F_y = \frac{B^2 A}{2\mu_0}\sin(2\alpha) \quad F_z = \frac{B^2 A}{2\mu_0}\cos(2\alpha)$$

In FIG. 8, positive $F_y$ acts to pull the upper bounding surface in the −y direction and it acts to pull the lower bounding surface in the +y direction. Positive $F_z$ acts to pull the upper bounding surface in the −z direction and it acts to pull the lower bounding surface in the +z direction.

STATEMENT OF THE INVENTION

According to the present invention there is provided a magnetic bearing wherein each of two bearing members carries a set of bearing elements and the bearing elements of a said set carried by one member are interleaved with the bearing elements of a said set carried by the other member to define three or more substantially parallel interleaf gaps between successive elements so that bearing forces can be developed as a result of magnetic shear stresses acting across those gaps.

A distinguishing feature of the most preferred embodiments of the present invention is that the magnetic bearing described achieves its bearing forces as the sum of force contributions from a number of parallel (or nearly-parallel) airgaps and each of these individual airgap force contributions comes about as the integration of magnetic shear stress over the airgap area brought about by causing lines of magnetic flux to cross the airgap at an angle to the normal. A substantial proportion of the lines of magnetic flux present within the bearing at any time are effective in producing useful airgap shear stress at three or more parallel airgaps.

The invention may, for example, provide a magnetic bearing comprising first and second bearing members each provided with at least two projecting elements which are interleaved to define at least three gaps between successive elements of the two bearing members, and a source of magnetomotive force (MMF) such that lines of magnetic flux cross interleaf gaps at an angle to the normal in order to generate a magnetic shear stress across each such gap thereby generating a bearing force or forces between the bearing members.

The present invention provides a bearing which may be of robust construction and it enables passive magnetic bearings of high stiffness to be obtained.

Advantageously, at least one source of magneto-motive force is in place such that at least one set of flux lines comes to exist which crosses three or more of the interleaf gaps and wherein at least the majority of the bearing force is developed as a result of magnetic shear stresses acting across such interleaf gaps.

In preferred embodiments of the invention, the source(s) of magneto-motive force is or are arranged so that a single set of flux lines comes to exist which crosses a set of three or more of the interleaf gaps and wherein at least the majority of the bearing force is developed as a result of magnetic shear stresses acting across that set of interleaf gaps. In order to create this effect, the magnetic flux is caused to follow a zig-zag pattern as it passes through the interleaved stack of bearing elements. It is especially preferred that substantially all the interleaf gaps are contained within said set. FIG. 9 illustrates this zig-zag path schematically.

A significant saving in weight and materials is possible as a result of this arrangement and accordingly it promotes low cost and high specific load capacity. A significant factor determining the weight of any magnetic bearing is the material which is required to complete the magnetic flux circuit, that is, to conduct the flux from one side of the set of gaps where it is useful in creating some bearing force contribution, to the other. Arranging for all (or many of) the gaps to be crossed by a single set of flux lines can minimise the weight associated with the magnetic return path for a given maximum bearing force capability.

Magnetic bearings in accordance with the invention may achieve a high load capacity through causing a reasonable working shear stress to exist at each one of numerous (nearly) parallel airgaps. To cause a magnetic shear stress to exist in an airgap, it is necessary to provide a source of magneto-motive force providing a magnetic flux, and to cause that magnetic flux to cross the airgap at an angle. The highest shear force for a given flux density will occur when that angle is 45°. It is thus advantageous to be able to control the way in which the lines of magnetic flux cross the various interleaf gaps of the bearing. Many different configurations can be devised which can cause some shear stress to exist. However, there are essentially only three distinct ways in which the path of magnetic flux can be altered from the path that it would naturally take through free space. These are (a) by placing some ferromagnetic material in the flux path, (b) by placing some permanent magnet material in the flux path, or (c) by placing some electric current in the flux path.

In some preferred embodiments of the invention, electrically conductive material is arranged within one or more of the interleaved bearing elements to allow the flow of electric currents in order to influence the path of magnetic flux across at least one interleaf gap. Alternatively, or in addition, permanent magnet material may be distributed within the interleaved bearing elements in order to influence the path of magnetic flux across at least one interleaf gap.

In yet other preferred embodiments of the invention, materials of different magnetic permeabilities are distributed within the interleaved bearing elements in order to influence the path of magnetic flux across at least one interleaf gap. In such cases, ferro-magnetic material is suitably distributed within the interleaved bearing elements for this purpose. Thus, ferro-magnetic material may be distributed patternwise within at least one of the interleaved bearing elements such that the reluctance experienced by a line of magnetic flux passing from one side of the bearing element(s) to the other is a strong function of the location of that flux line; this dependence of reluctance on location then serving to influence the path of magnetic flux across at least one interleaf gap.

Any or all of these methods of influencing magnetic flux across at least one interleaf gap may be incorporated in a single embodiment of the invention. FIGS. 10, 11 and 12 indicate schematically how the three different effects (non-uniform permeability in a bearing element, permanent magnet material in a bearing element and electric current in the plane of a bearing element) can influence the path of magnetic flux across airgaps.

In those embodiments which contain some permanent magnet material in one or more of the bearing elements or some distributions of electric current in one or more of the bearing elements, it may or may not be necessary to provide a separate source of magneto-motive force.

In some preferred embodiments of the invention, the bearing is constituted as an active bearing. In other preferred embodiments of the invention, the bearing is constituted as a passive bearing. In yet other preferred embodiments of the invention, the source of magneto-motive force comprises a single coil for selectively adjusting the total flux linkage in which case the bearing is constituted as a semi-active bearing.

In some preferred embodiments of the invention, the bearing is constituted as a linear bearing. In other preferred embodiments of the invention, the bearing of the invention is constituted as a rotational bearing. When constituted as a rotational bearing, the bearing may be arranged to create radial bearing forces or to create axial bearing forces.

Preferably one said bearing member has one more interleaving element than the other. This promotes bearing symmetry, and it also entails that there are at least four such gaps. A shear stress is achieved in each of these gaps. By providing multiple gaps, the total surface area acting to generate the force or forces between the bearing members will be increased, and a high load capacity bearing can be realised. The width of the gaps present in the bearing has a minimum value determined by the achievable registration of the two bearing members.

The number of interleaving elements may be increased as convenient to increase the number of interleaf gaps and thus the total surface area acting to generate the force or forces between the bearing members. There are preferably at least six, and more preferably at least eight or ten such interleaf gaps, and there may be as many as twenty-six or even more.

The gaps between interleaving elements are optionally filled by a non-magnetic fluid. The gaps may be occupied by air. The gaps may be evacuated.

In those embodiments which contain non-uniform distributions of ferro-magnetic material, the regions of high permeability may be constituted by one or more ferromagnetic materials and the regions of low permeability may be constituted by any non-ferromagnetic material, for example a composite such as a fibre-reinforced resin material. Carbon-fibre composites are particularly suitable.

The force or forces between the bearing members may be generated in either one or two directions. The force or forces between the bearing members is preferably in a direction parallel to the central surfaces of the gaps. The force or forces between the bearing members act in a direction broadly parallel to the central surface of the gaps.

The elements of the first bearing member may be attached together. The elements of the second bearing member may be attached together. The elements may be mounted on a mechanical platform. The mechanical platform may be a shaft, or may be a sleeve that may be fitted onto a shaft. The mechanical platform may be a shell which may hold the elements together at their outer edges. The mechanical platform is preferably made from a non-magnetic material in order to prevent it from providing a magnetic short circuit.

The interleaving elements of the first and second bearing members may be annular discs. In a rotational bearing, such discs will be mounted normal to the axis of rotation. Such interleaving discs may be arranged to produce bearing forces which act normal to the bearing rotation axis.

The interleaving elements of the first and second bearing members may be cylinders. In a rotational bearing, such cylinders will be mounted coaxially with the axis of bearing rotation. Such interleaving cylinders may be arranged to produce bearing forces which act coaxially with or normal to the bearing rotation axis, according to the way in which the magnetic flux is caused to weave between the interleaving cylinders.

In yet further embodiments of the invention, the interleaving elements of the first and second bearing members may be conical. In a rotational bearing, such conical elements will be mounted coaxially with the axis of bearing rotation. Such interleaving conical elements may be arranged to produce bearing forces which act coaxially with or normal to the bearing rotation axis, according to the way in which the magnetic flux is caused to weave between the interleaving conical elements.

The interleaving elements, whether they be annular discs, or cylindrical or conical elements, or linear bearing elements, may be constructed of laminated steel. Other construction methods or materials are also possible including use of a powder metallurgy composites having high resistivity and the use of composite material which comprise a fraction of magnetic wire embedded in a matrix and appropriately oriented.

The MMF source or sources may comprise a series of permanent magnets, or two concentric coils, or four identical pieces reminiscent in geometry of a G-clamp. The MMF source or sources may also serve to complete the magnetic path through the bearing. The MMF source or sources may comprise a return path on only one end of the bearing.

The first bearing member may be a rotor and the second bearing member may be a stator of a rotating machine. Alternatively, the first bearing member may be the stator and the second bearing member may be the rotor of a rotating machine. The MMF source or sources are preferably in the same frame of movement as the bearing stator when provided.

The magnetic bearing may be a passive magnetic bearing, or may be an active magnetic bearing. The magnetic bearing may be a compact and light high-force capacity active magnetic bearing. The magnetic bearing may be a compact high-stiffness passive magnetic bearing. This invention provides for a passive bearing having stiffness-per-unit-volume which is many times larger than the stiffness-per-unit-volume offered by conventional designs of passive bearing. The magnetic bearing may be a compact high-stiffness passive magnetic bearing which permits relative rotation but resist relative axial motion by producing a restoring thrust. The magnetic bearing may be a passive thrust bearing having axial thrust capacity per unit volume/mass which is many times larger than the thrust per unit volume offered by other designs of passive magnetic thrust bearing. The magnetic bearing may provide for a substantially higher axial stiffness per unit volume/mass which is much higher than that offered by other designs of passive magnetic thrust bearings. The magnetic bearing may provide for substantial axial thrust given a comparatively small amount of relative axial motion while offering little or no resistance to relative rotation.

BRIEF DESCRIPTION OF THE DRAWINGS

Some preferred embodiments of the present invention will now be described by way of example only, with reference to the following diagrammatic drawings, in which:

FIG. 7a shows normal stresses in a given plane of a magnetic field in air;

FIG. 7b shows shear stresses in a given plane of a magnetic field in air;

FIG. 8 illustrates magnetic flux passing at an angle, α, to the z axis;

Reference has already been made to FIGS. 1 to 12.

Specific Embodiment "A". A Passive Radial Magnetic Bearing

FIGS. 13 to 18 show a passive radial magnetic bearing according to a first embodiment of the present invention. The magnetic bearing comprises three main components, a bearing rotor member 1, a bearing stator member 2 and a magnetomotive force (MMF) source 3.

Recognising that the function of a so-called radial bearing is to maintain a given relative lateral position of two bearing members undergoing relative rotation, it is clear that either bearing member may stationary and the other one moving. Here and elsewhere in the description, the terms bearing rotor and bearing stator are used only to distinguish between the two bearing members. It will be implicitly assumed, at least in the case of rotational bearings, that the MMF source is in the same frame of movement as the bearing stator member.

Figure 1:
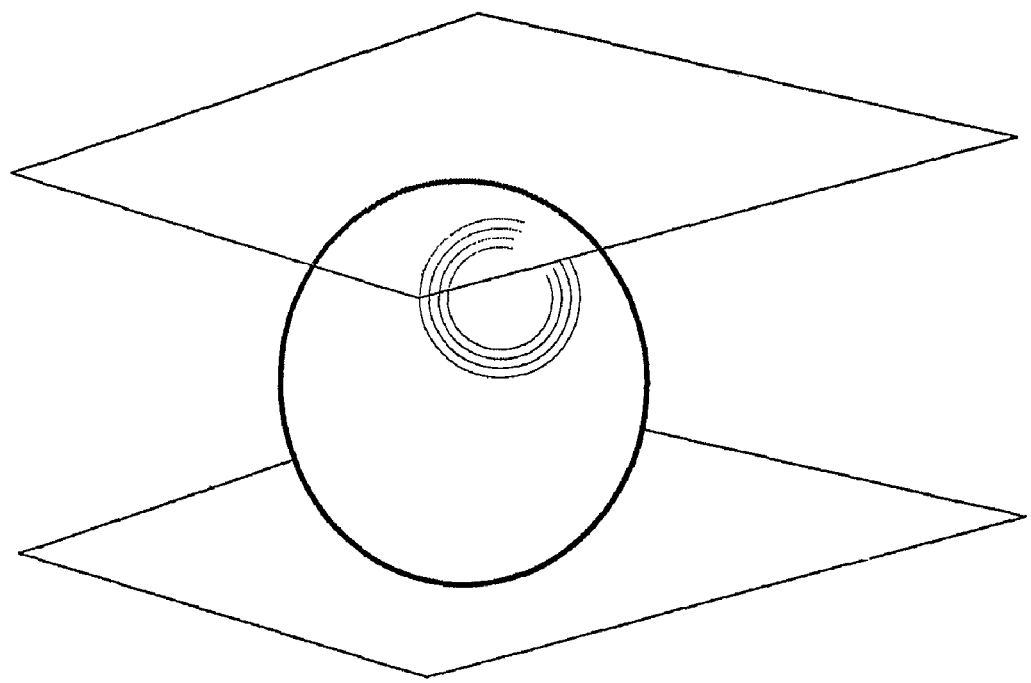
FIG. 1 illustrates an elementary bearing region from a ball bearing.
Figure 2:
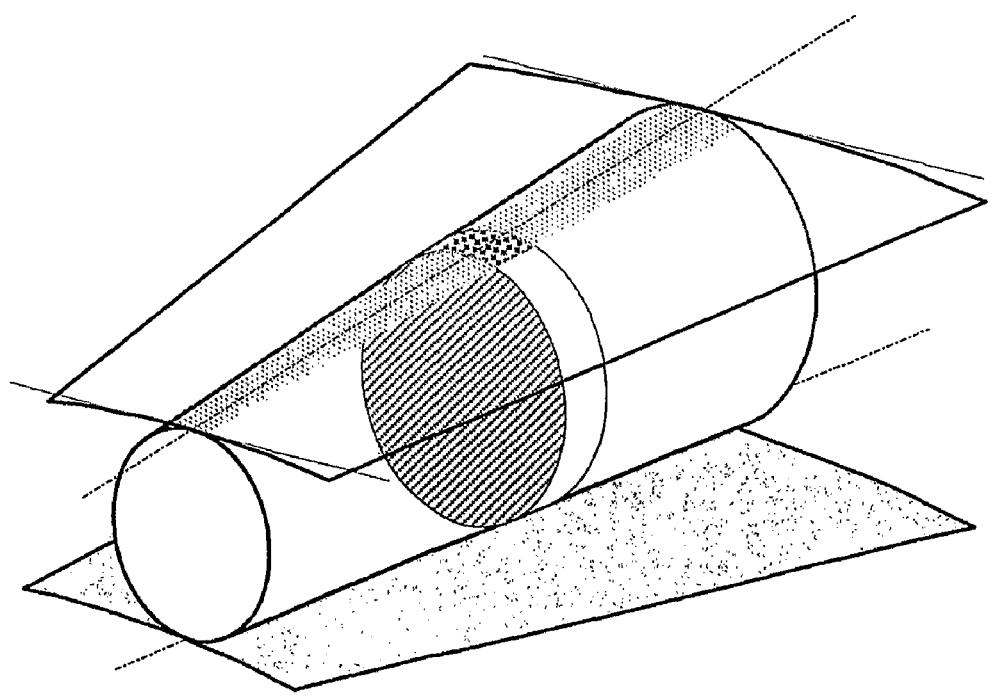
FIG. 2 illustrates an elementary bearing region from a conical roller bearing.
Figure 3:
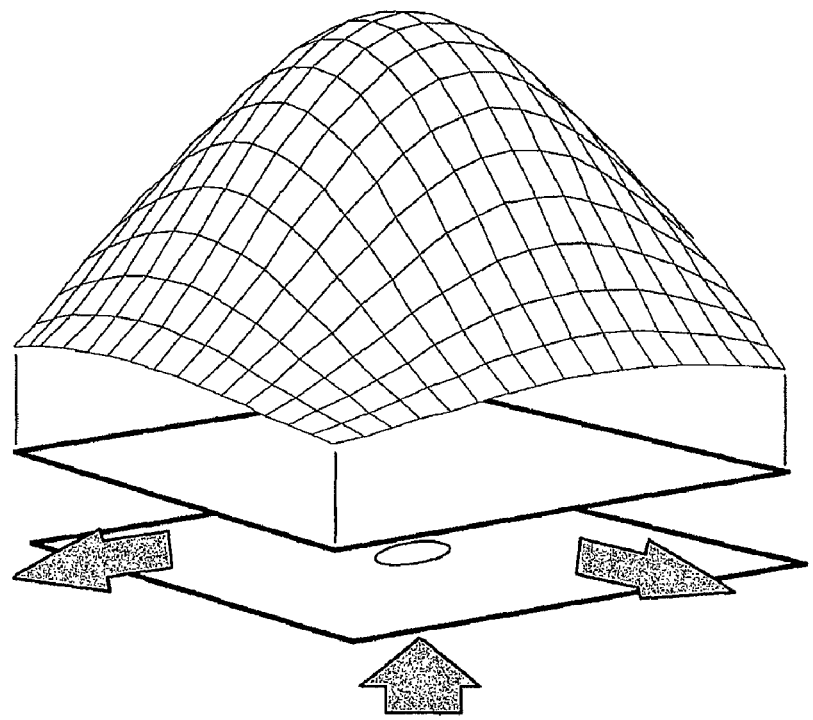
FIG. 3 illustrates an elementary bearing region from a hydrostatic bearing.
Figure 4:
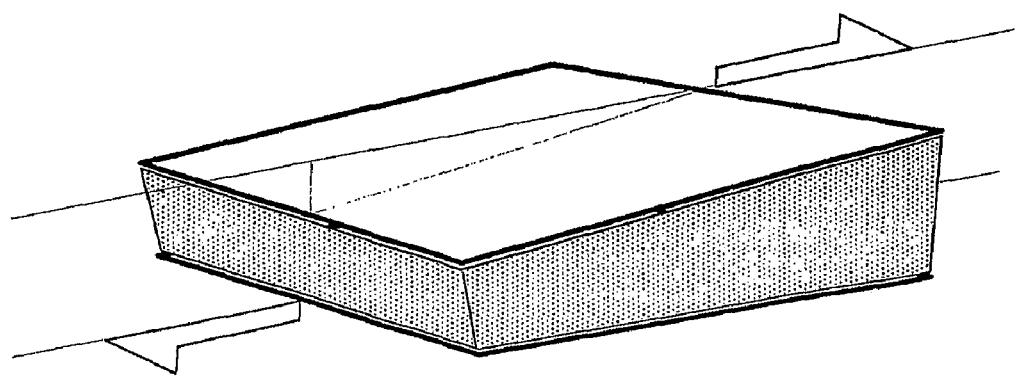
FIG. 4 illustrates a fluid wedge and relative motion in an elementary bearing region from a hydrodynamic bearing.
Figure 5:
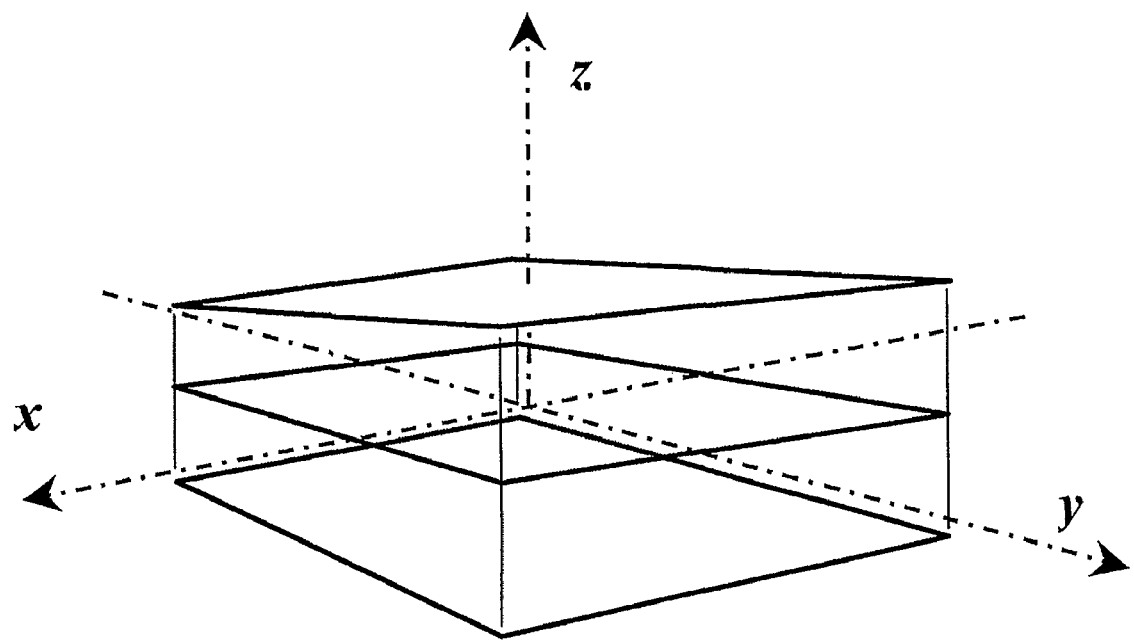
FIG. 5 illustrates the principal (orthogonal) directions for every elemental bearing surface region, axis z being normal to the central surface.
Figure 6:
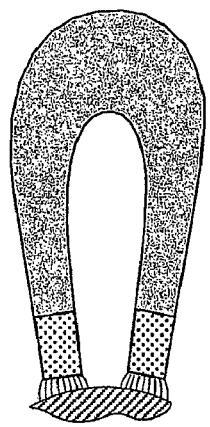
FIG. 6 illustrates the action of tensile Maxwell stress in the simplest where a horse-shoe shaped permanent magnet drives a magnetic field through itself, an airgap (twice) and some second body.
Figure 9:
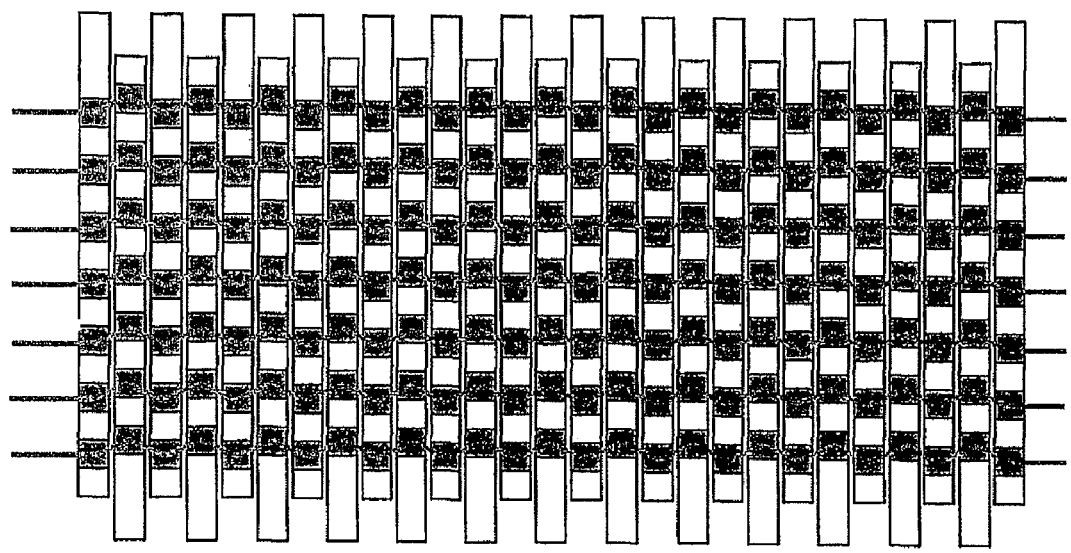
FIG. 9 illustrates magnetic flux passing in "zig-zag" pattern through parallel airgaps.
Figure 10:
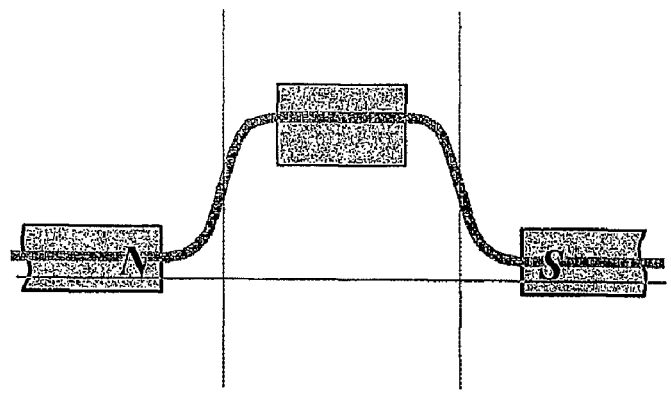
FIG. 10 illustrates a bundle of magnetic flux being directed by a region of high permeability.
Figure 11:
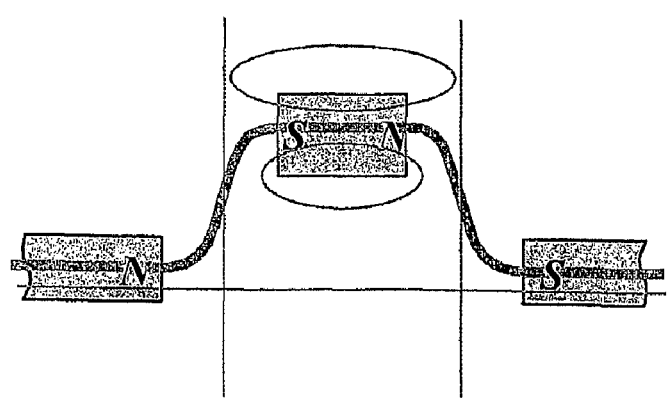
FIG. 11 illustrates a bundle of magnetic flux being directed by a permanent magnet.
Figure 12:
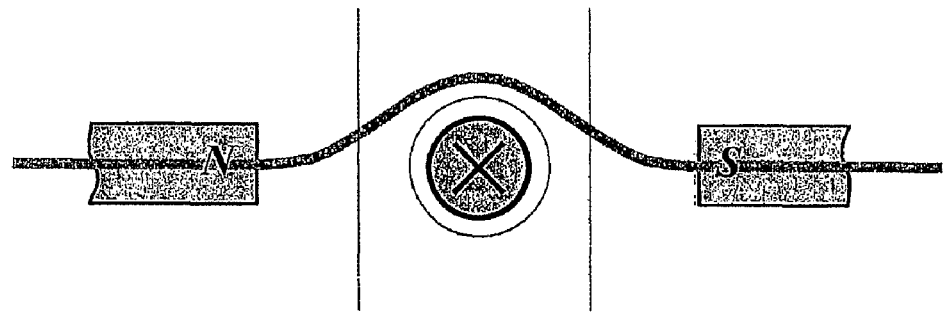
FIG. 12 illustrates a bundle of magnetic flux being directed by a line of current.
Figure 13:
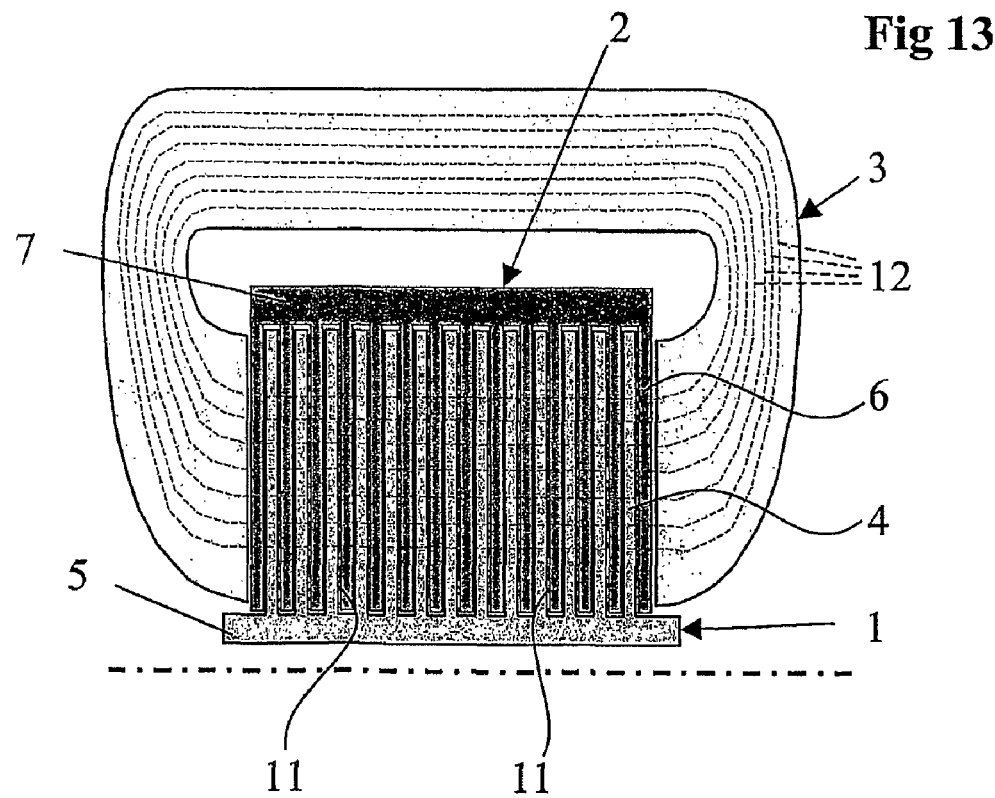
FIG. 13 is a cross sectional view of half of a passive radial bearing according to a first embodiment of the present invention.

FIG. 13 shows a cross section through half of the bearing rotor 1, the bearing stator 2 and the MMF source 3. In this figure, it is shown that the MMF source also serves to complete the magnetic path. The dashed lines 12 in FIG. 13 indicate the direction of flow of magnetic flux. The MMF source provides a reasonably homopolar MMF through the bearing rotor and bearing stator. That is to say, any section through the bearing will reveal more or less the same pattern and density of magnetic flux passing through the rotor and stator.

Figure 14:
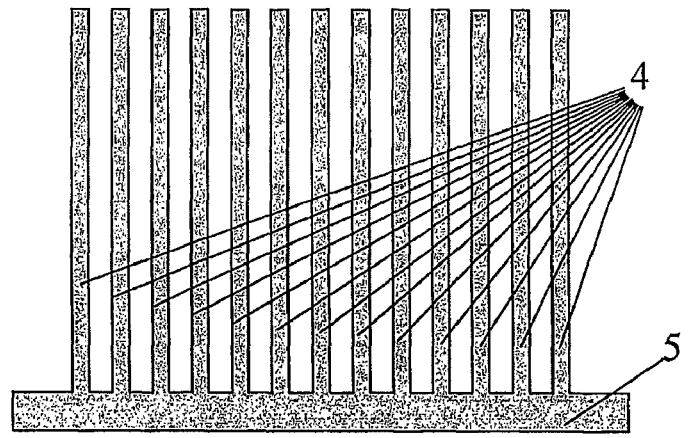
FIG. 14 is a cross sectional view of half of the bearing rotor of FIG. 13.

The bearing rotor 1 comprises a number of circular rotor plate bearing elements 4 mounted onto a single mechanical platform 5 as FIG. 14 illustrates. The central planes of the rotor plate bearing elements 4 are normal to the axis of rotation. The mechanical platform 5 is a sleeve that may be fitted onto a shaft. The mechanical platform of the bearing rotor 1 is made from a non-magnetic material so that it does not provide a magnetic short-circuit for the set of magnetic flux lines 12 which pass through the rotor and stator plate bearing elements 4, 6, and thus also through the interleaf gaps 11 defined by those bearing elements.

Figure 15:
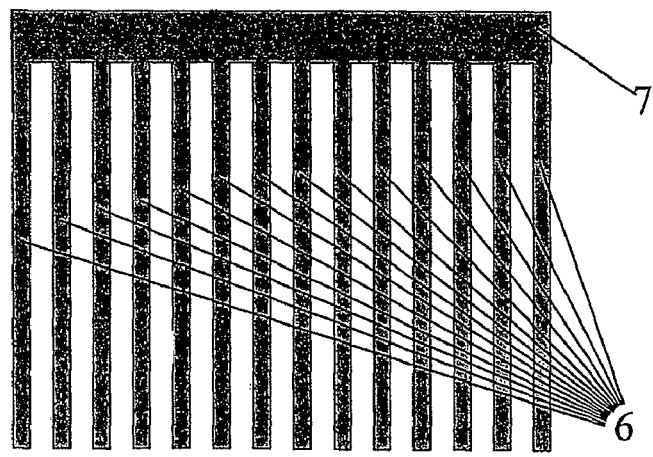
FIG. 15 is a cross sectional view of half of the bearing stator of FIG. 13.

The bearing stator 2 comprises a number of circular stator plate bearing elements 6 mounted onto a single mechanical platform 7 as FIG. 15 illustrates. Like the rotor plate bearing elements, the central planes of the stator plate bearing elements are also normal to the axis of rotation. The mechanical platform 7 is a shell which holds the stator plate bearing elements together at their outer diameters. The mechanical platform 7 of the bearing stator 2 is made from a non-magnetic material so that it does not provide a magnetic short-circuit for the magnetic flux intended to pass through the rotor and stator plate bearing elements.

Figure 16:
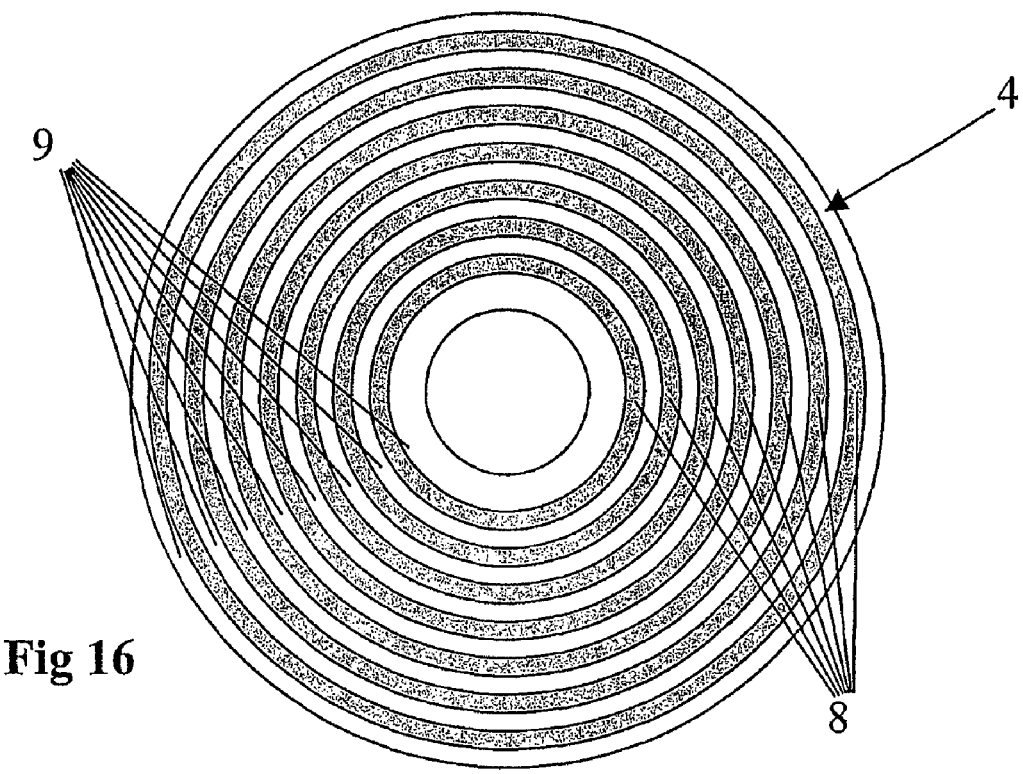
FIG. 16 is a plan view of a rotor plate bearing element of FIG. 13.
Figure 17:
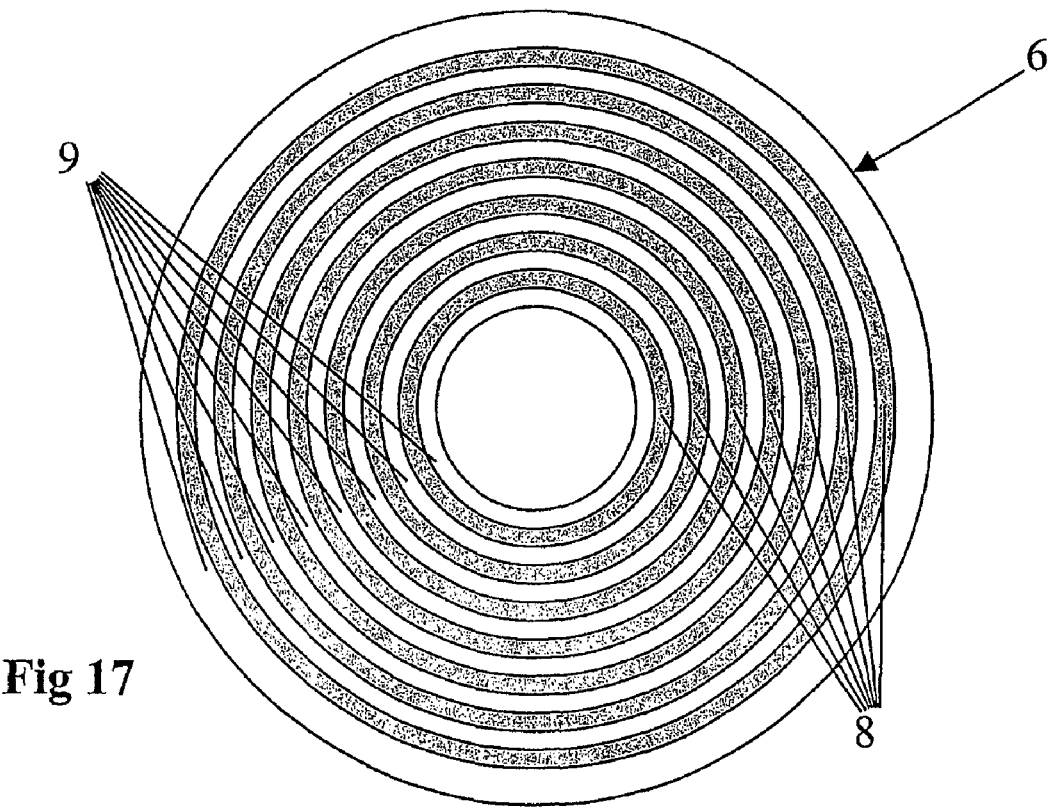
FIG. 17 is a plan view of a stator plate bearing element of FIG. 13.

All of the rotor plate bearing elements 4 are similar to each other and all of the stator plate bearing elements 6 are also similar to each other except that the two end-plate bearing elements may be different in the sense that these may be integral with the MMF source 3. Any single rotor plate bearing element 4 appears almost identical to a stator-plate bearing element 6. The principal difference is that the innermost and outermost diameters on a rotor plate bearing element 4 are slightly smaller than those of a stator plate bearing element 6. FIG. 16 shows a rotor plate bearing element 4 and FIG. 17 shows a stator plate bearing element 6. Each of these plate bearing elements comprises a set of annular regions of high permeability 8 spaced apart by a set of annular regions of relatively low permeability 9. The radial spacing of the regions of high permeability 8 is the same for the rotor plate bearing elements as it is for the stator plate bearing elements and the regions of high permeability 8 have, to a very crude approximation, the same radial depth as the regions of low permeability 9 on both the stator and rotor plate bearing elements. The dimensions of this radial spacing have been exaggerated in the diagrams for clarity. In practice, the radial pitch of the regions of high permeability 8 would be roughly in the order of three times the maximum relative lateral movement allowable between the bearing rotor 1 and the bearing stator 2. The dimension of the airgaps between the rotor and stator plate bearing elements would typically be around one half of this radial depth.

Figure 18:
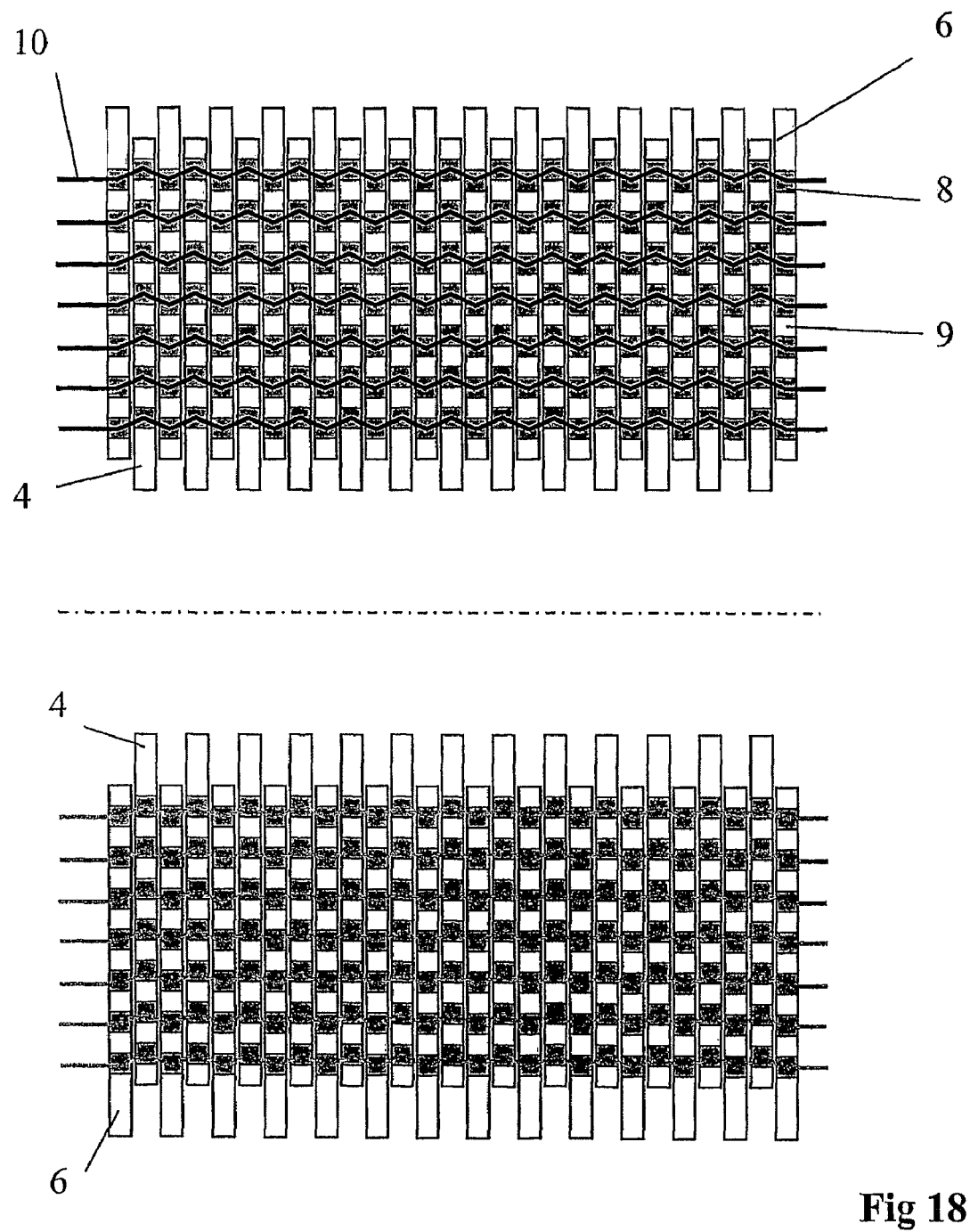
FIG. 18 is a cross sectional view of the entire bearing of FIGS. 13 to 17.

FIG. 18 shows a cross-section through the combined bearing rotor and bearing stator with a degree of lateral misalignment present between them in the plane of the section. Only the rotor plate bearing elements 4 and the stator plate bearing elements 6 are shown with the regions of high permeability 8 and low permeability 9 in these plate bearing elements. Clearly the regions of high permeability 8 are not aligned. The effect of the MMF source is to try to drive magnetic flux axially through the stack of rotor plate bearing elements 4 stator plate bearing elements 6 and airgaps therebetween. Where portions of the regions of high permeability are aligned, relative high densities of flux are passed but very little force is generated between the rotor and the stator where this occurs. Where portions of the regions of high permeability are not aligned, the total reluctance of the axial magnetic path between the two ends is higher and such magnetic flux as does flow along this path is forced to follow a "zig-zag" trajectory. FIG. 18 includes lines 10 indicating this zig-zag trajectory broadly as magnetic flux attempts to pass axially through the stack of interleaved rotor plate bearing elements 4 and stator plate bearing elements 6. The fact that the flux passes through each airgap at an angle means that there is some useful shear stress present and the effect of this shear stress is to try to pull the rotor and stator back into lateral (radial) alignment.

Figure 19:
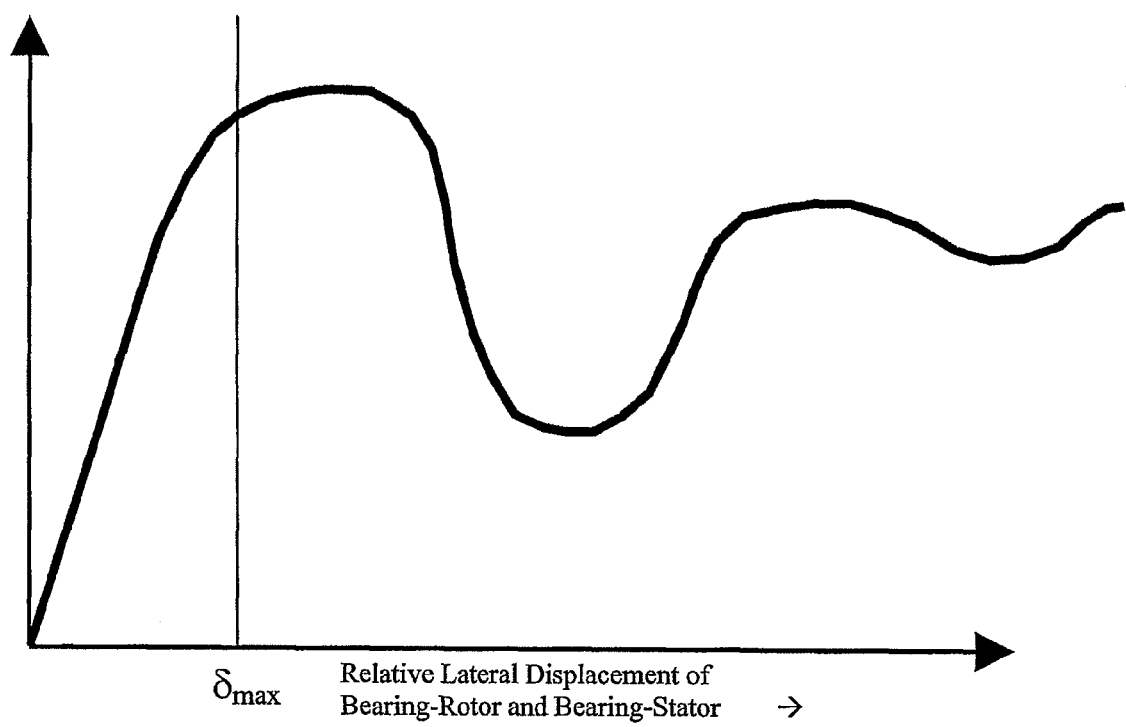
FIG. 19 is a plot of static restoring force as a function of relative lateral displacement between a bearing rotor and a bearing stator.

FIG. 19 shows a typical plot of static restoring force as a function of relative lateral displacement between bearing rotor and bearing stator for a fixed axial MMF in the MMF source. Evidently, there is some relative displacement, $\delta_{max}$, above which little additional force is available if displacement is increased further. This deflection, $\delta_{max}$, is approximately equal to one quarter of the mean radial distance between the centres of adjacent regions of high permeability on the rotor or stator plate bearing elements. The maximum anticipated relative deflection between the bearing rotor and bearing stator therefore provides a lowest bound for the radial spacing of regions of high permeability in the rotor and stator plate bearing elements.

The thickness of airgaps present in the bearing has a minimum value determined by the achievable axial registration of the bearing rotor relative to the bearing stator. In order for the bearing to be effective, the radial spacing between regions of high permeability must be substantially greater than the mean airgap thickness—typically 2 to 10 times greater. Hence achievable axial registration effectively places another lower bound on radial spacing of the regions of high permeability.

The axial thicknesses of the rotor and stator discs have two separate lower bounds: shear stresses ($\tau_{r\theta}$) in the discs and the fact that these thicknesses should be substantially larger than the airgap axial thickness. The thicknesses of the rotor and stator discs may well vary with respect to radius. For reasons of withstanding shear stresses, the rotor plate bearing elements may be particularly thick at their inner diameters, progressively reducing in thickness, e.g. uniformly, to their outer diameters. The thickness of stator plate bearing elements would be determined largely by the requirements for some minimum thickness at the small radii and for maintaining a productive airgap at the other radii. The stator plate bearing elements may vary in thickness so as to provide parallel sided gaps with interleaved rotor plate bearing elements.

Figure 20:
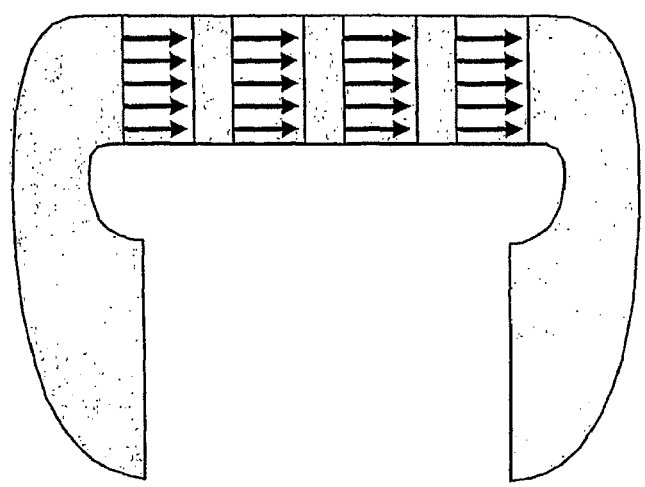
FIG. 20 is a schematic view of a first embodiment of the MMF source of FIGS. 13 to 19.
Figure 21:
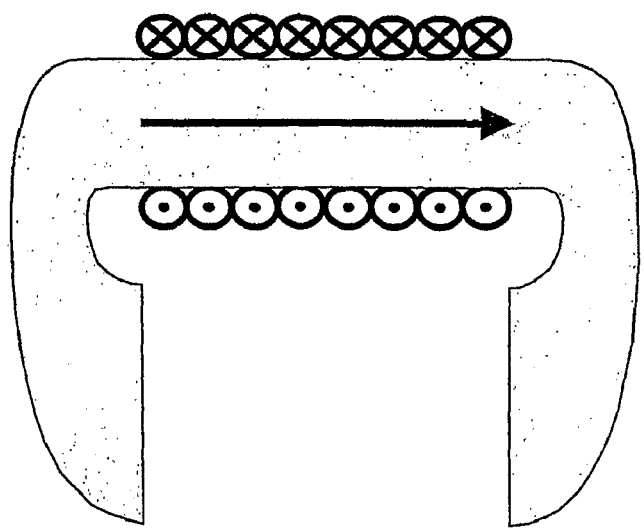
FIG. 21 is a schematic view of a second embodiment of the MMF source of FIGS. 13 to 19.
Figure 22:
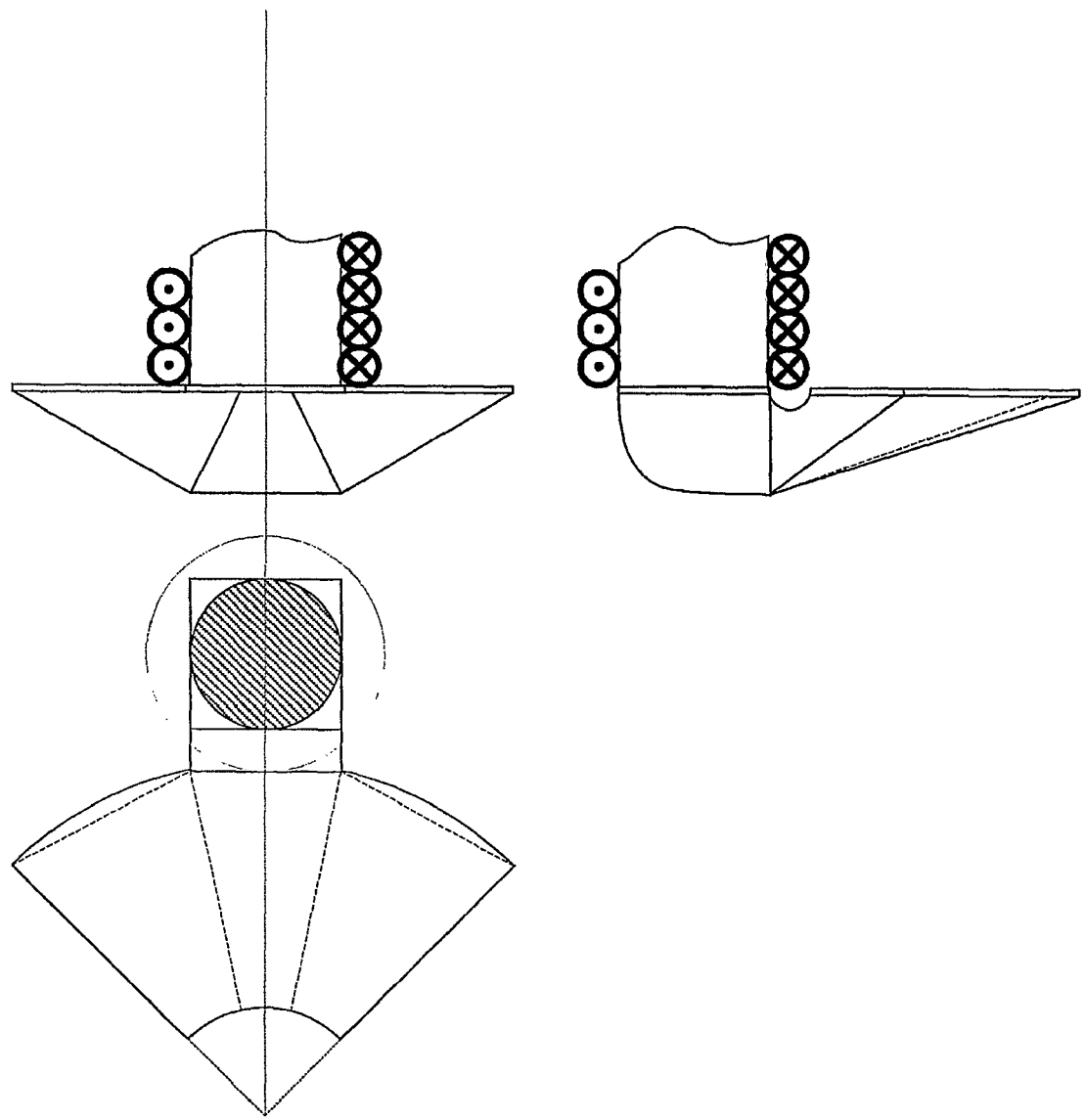
FIG. 22 is a schematic view of a third embodiment of the MMF source of FIGS. 13 to 19.

The actual MMF present in the MMF source may take any one of numerous forms. Often it may comprise a series of permanent magnets stacked up in the return path as shown in FIG. 20. FIG. 21 shows how two concentric coils may be used to very similar effect. FIG. 22 shows how the MMF source might for a given bearing be comprised of four identical pieces reminiscent in geometry of a G-clamp. FIG. 22 only depicts one half of one G-clamp.

The regions of high permeability 8 in either the rotor or stator plate bearing elements or even both, may themselves be permanent magnet materials. The regions of low permeability 9 in the rotor plate bearing elements 4 might often be created as carbon-fibre (or other fibre) composite in order to promote stability and mechanical integrity in each rotor plate bearing element.

Specific Embodiment "B". A Passive Axial Magnetic Bearing

FIGS. 23 to 27 show a passive axial magnetic bearing according to a second embodiment of the present invention. The magnetic bearing described here provides for substantial axial thrust given a comparatively small amount of relative axial motion while offering little or no resistance to relative rotation. The bearing comprises three main components, a bearing rotor member 21, a bearing stator member 22 and an MMF source 23.

Figure 23:
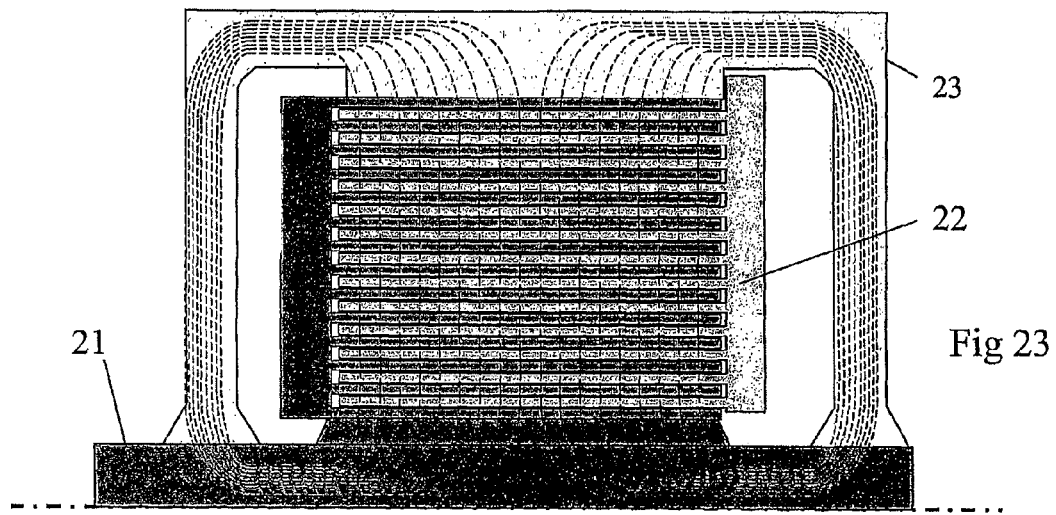
FIG. 23 is a cross sectional view of half of a passive axial thrust bearing according to a second embodiment of the present invention.

FIG. 23 shows a cross section through half of the bearing rotor, the bearing stator and the MMF source. In this figure, it is shown that the MMF source also serves to complete the magnetic path. The dashed lines in FIG. 23 indicate the direction of flow of magnetic flux. The MMF source provides a reasonably homopolar MMF through the bearing rotor 21 and bearing stator 22. That is to say, any section through the bearing including the axis of rotation in the plane of section will reveal more or less the same pattern and density of magnetic flux passing through the rotor and stator.

Figure 24:
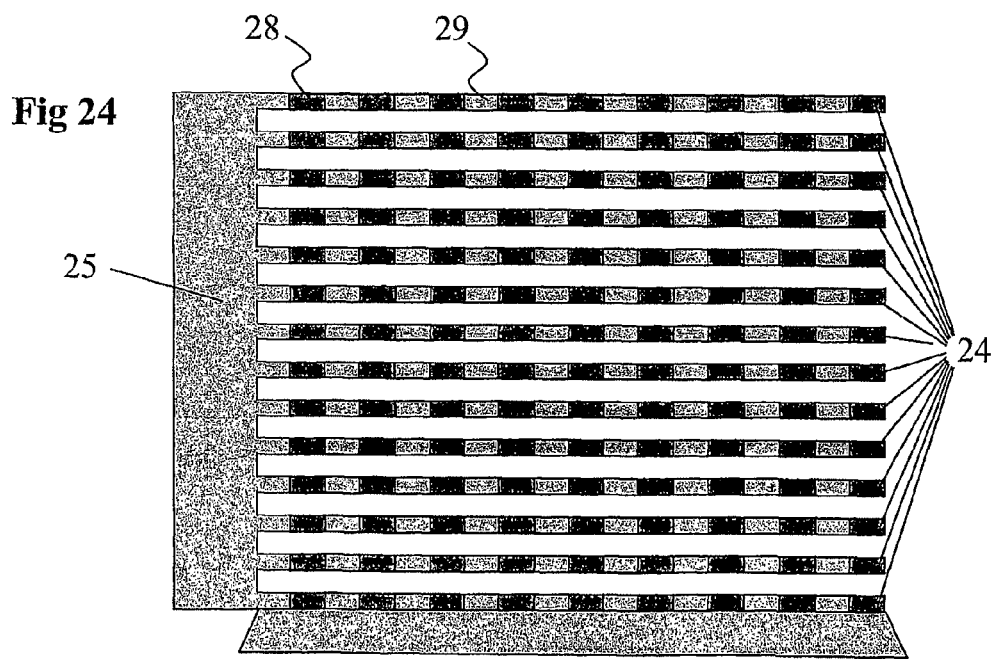
FIG. 24 is a section through the bearing-rotor of the bearing shown in FIG. 23 in which regions (annuli) of high permeability are shown as dark rectangles.

The bearing rotor 21 comprises a number of concentric cylindrical rotor plate bearing elements 24 mounted onto a single mechanical platform 25 as FIG. 24 illustrates. FIG. 24 is a cross section through the bearing rotor 21 where the plane of section includes the axis of rotation. The mechanical platform 25 is generally disc-shaped and it is made from a non-magnetic material so that it does not provide a magnetic short-circuit for the magnetic flux intended to pass through the rotor and stator plate bearing elements.

Each of the rotor plate bearing elements 24 comprises a set of ring-shaped regions 28 of high relative magnetic permeability spaced apart at regular intervals by a set of ring-shaped regions 29 of low relative permeability.

Figure 25:
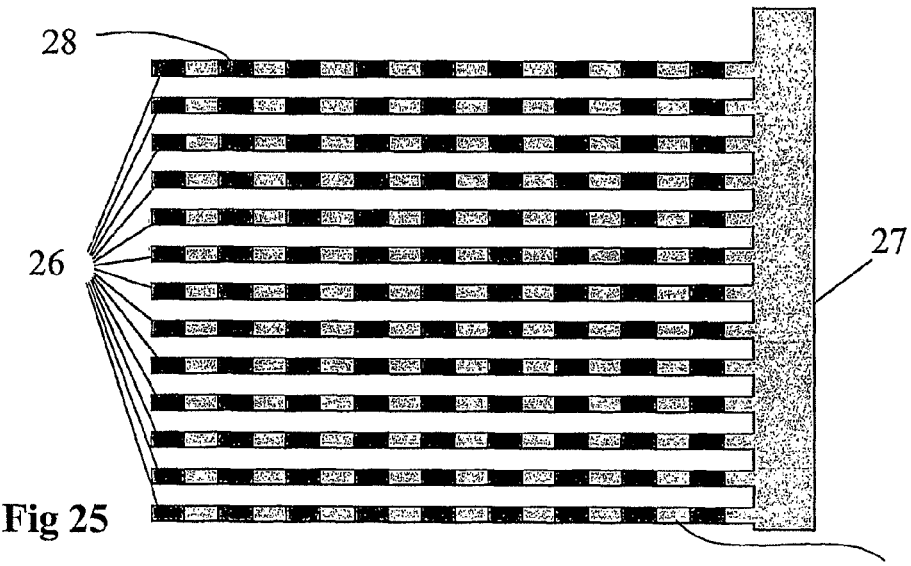
FIG. 25 is a cross-section of the bearing-stator of the bearing shown in FIG. 23 in which regions (annuli) of high permeability are again shown as dark rectangles.

The bearing stator 22 comprises a number of concentric cylindrical stator plate bearing elements 26 mounted onto a single mechanical platform 27 as FIG. 25 illustrates. FIG. 25 is a cross section through half of the bearing stator 22 where the plane of section includes the axis of rotation. The mechanical platform 27 shown in FIG. 25 is generally disc-shaped and it is made from a non-magnetic material so that it does not provide a magnetic short-circuit for the magnetic flux intended to pass through the rotor and stator plate bearing elements.

Each of the stator plate bearing elements 26 comprises a set of ring-shaped regions 28 of high relative magnetic permeability spaced apart at regular intervals by a set of ring-shaped regions 29 of low relative permeability.

Figure 26:
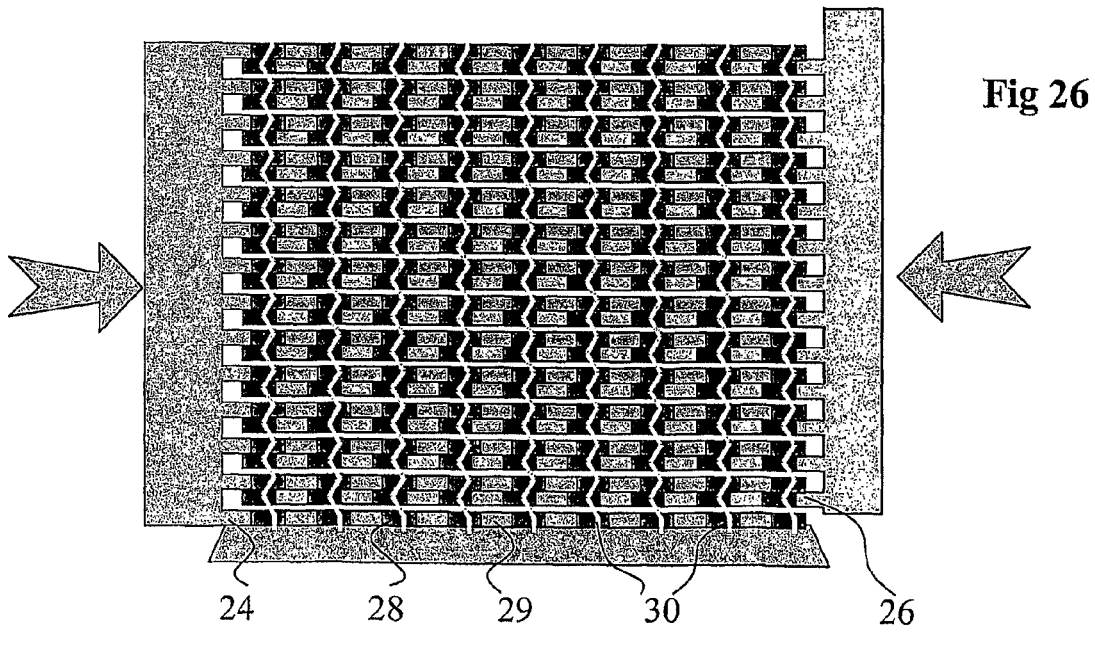
FIG. 26 is a cross-section of the bearing-stator and bearing-rotor of the bearing shown in FIG. 23 with some axial displacement showing how reaction developed.

FIG. 26 shows a cross section through half of the combined bearing rotor 21 and bearing stator 22 with a degree of axial misalignment present between them in the plane of the section. Only the rotor plate bearing elements 24 and the stator plate bearing elements 26 are shown, with the regions of high permeability 28 and low permeability 29 in these plate bearing elements. Clearly the regions of high permeability are not aligned. The effect of the MMF source is to try to drive magnetic flux-radially through the stack of stator plate bearing elements 24, rotor plate bearing elements 26 and airgaps therebetween. Where portions of the regions of high permeability are aligned, the interleaved arrangement of rotor plate bearing elements 24 and stator plate bearing elements 26 offers a relatively low reluctance path for magnetic flux and very little net force is generated between the rotor and the stator. Where portions of the regions of high permeability are not aligned, the total reluctance of the axial magnetic path between the two ends is higher and the magnetic flux is forced to follow a "zig-zag" trajectory. FIG. 26 includes lines 30 indicating this zig-zag trajectory broadly as magnetic flux attempts to pass radially through the stack of interleaved rotor and stator plate bearing elements. The fact that the flux passes through each airgap at an angle means that there is some useful shear stress present and the effect of this shear stress is to try to pull the rotor and stator back into axial alignment.

The thickness of airgaps present in the bearing has a minimum value determined by the achievable transverse registration of the bearing rotor 21 relative to the bearing stator 22. In order for the bearing to be effective, the axial spacing between regions of high permeability must be substantially greater than the mean airgap thickness. Hence achievable transverse registration effectively places a lower bound on axial spacing of the regions of high permeability. Using more closely-spaced regions of high permeability makes for a higher-stiffness axial bearing but it does not greatly influence the amount of axial force available. If the axial spacing becomes too small relative to the airgaps, the available axial force is compromised.

The radial thicknesses of the rotor cylindrical plate bearing elements 24 and stator cylindrical plate bearing elements 26 have two separate lower bounds: shear stresses ($\tau_{z\theta}$) in the cylinders and the fact that these thicknesses should be substantially larger than the airgap radial thickness. The thicknesses of the stator plate bearing elements and rotor plate bearing elements may well vary with respect to axial position. For reasons of withstanding shear stresses, the rotor plate bearing elements may be particularly thick at their roots—near to the mechanical platform 25 for the bearing-rotor 21. The same is true for the stator plate bearing elements 26 for the same reasons.

Figure 27:
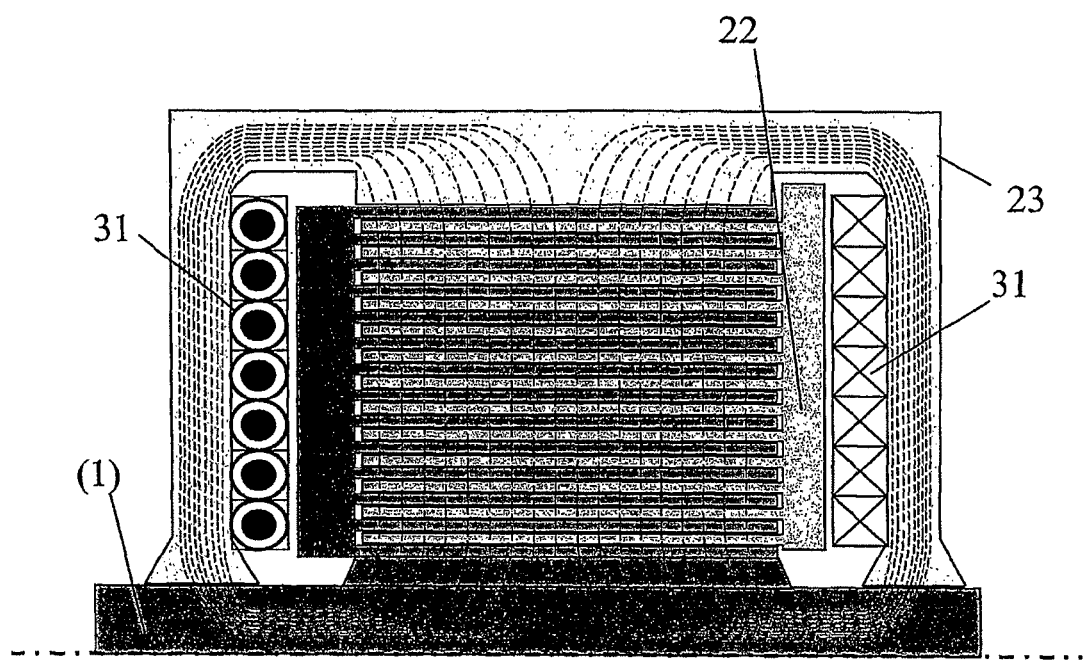
FIG. 27 is a schematic showing the 3 principal components and in particular the coils (8) which contribute the homopolar MMF in the bearing shown in FIG. 23.

The actual MMF present in the MMF source 23 may take any one of numerous forms. Often it may comprise a series of permanent magnets stacked up in the return path either oriented axially in the "cylindrical" part of the MMF source 23 or radially in the "disc-shaped" part of the MMF source 23. FIG. 27 shows how the MMF can be created satisfactorily by providing coils 31 wound in order to drive homopolar flux.

The regions of low permeability in the rotor might often be created as carbon-fibre (or other continuous-fibre) composite in order to enhance mechanical integrity in the rotor plate bearing elements 24 and stator plate bearing elements 26—particularly with regard to withstanding high rotational speeds.

In FIG. 23, the MMF source was shown as a two-sided provision insofar as there are radial return-paths for the magnetic flux through the MMF source at both ends of the bearing. In many instances, there may be a return path on only one end of the bearing. The cross-sections of the regions of high permeability in the rotor plate bearing elements 24 and stator plate bearing elements 26 are shown as rectangles in the figures. Depending on the desired shape of the force-deflection curve, these might be shaped differently. In FIGS. 24 and 25, the regions of low permeability in the rotor plate bearing elements and stator plate bearing elements appear to have identical dimensions to the regions of high permeability. In general this will not necessarily be the case. One argument prevails in at least some cases for reducing the axial-lengths of the regions of high permeability relative to the regions of low permeability in order to reduce the requirement for a very thick return path in the MMF source. In FIG. 26, the shaft is a part of the magnetic circuit. In general the shaft may or may not form a part of the circuit. If the shaft is non-magnetic, an inner sleeve must be provided to complete the magnetic circuit. This sleeve may be physically connected to either the rotor or the stator. Clearly, in at least some cases, it is sensible to connect it to the shaft. The regions of high permeability in either the rotor or stator plate bearing elements or both, may themselves be made from permanent magnet material magnetised with a homopolar magnetisation in the radial direction. In such cases, it may or may not be necessary for the component named the MMF source to contribute any net MMF to the magnetic circuit in which case its role would be purely one of completing the magnetic circuit.

Specific Embodiment "C". An Active Radial Magnetic Bearing

FIGS. 28 to 35 show an active radial magnetic bearing according to a third embodiment of the present invention. The magnetic bearing comprises four main components, a bearing rotor member 33, a bearing stator member 34, an external MMF source 35 and an internal MMF source 36. In the present embodiment, the internal and external MMF sources are in the same frame of movement as the bearing stator.

Figure 28:
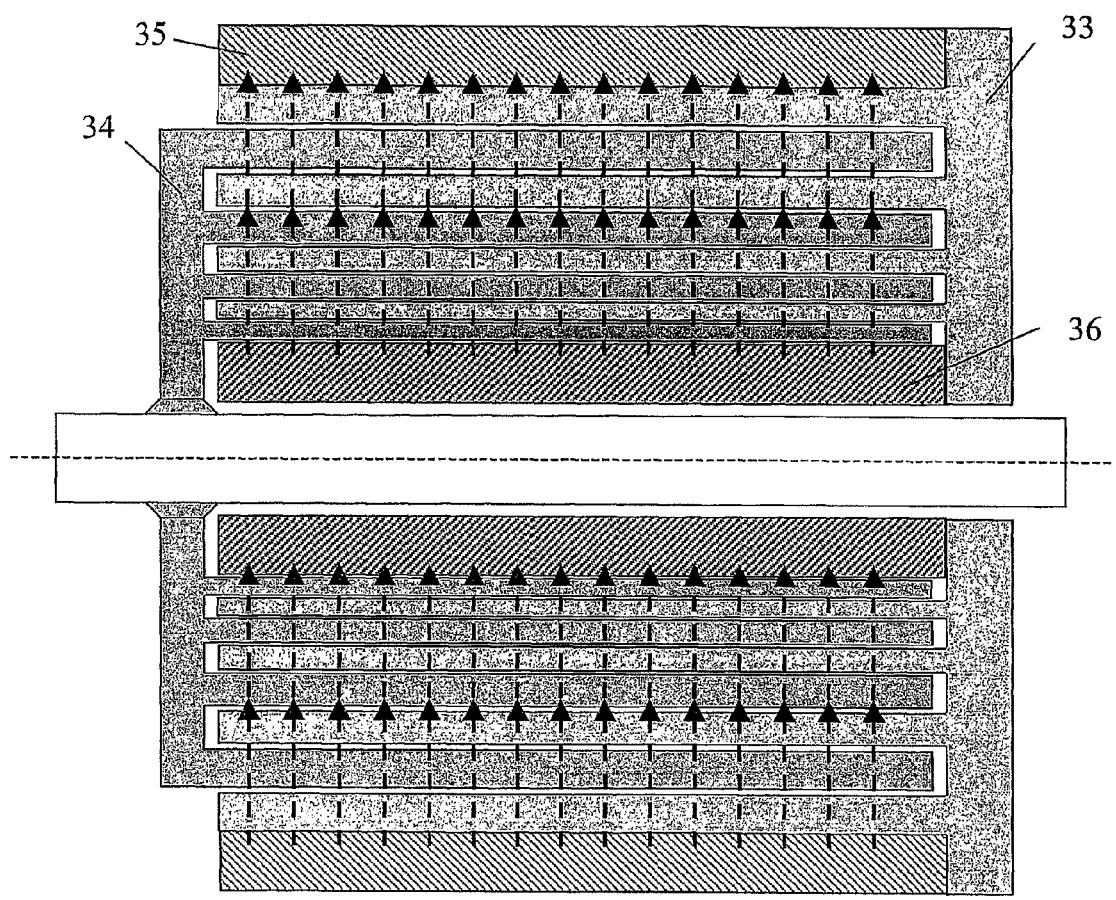
FIG. 28 is a cross-section parallel to the axis of rotation of an interleaved-cylinders embodiment of active radial bearing according to a third embodiment of the invention in which lines of magnetic flux are shown as dashed vertical lines with arrows.

FIG. 28 shows a cross section through the bearing rotor, the bearing stator and the external and internal MMF sources. This section is taken parallel to the axis of rotation. The dashed lines in FIG. 28 indicate the direction of flow of magnetic flux. The MMF sources generate a 2-pole MMF pattern through the bearing. That is to say, given any diametral line at angle $\theta$, the net MMF across the bearing along any such diametral line varies according to $\cos(\theta+\phi(t))$ where $\phi(t)$ is some time-dependent phase-shift. In this figure, it is implicit that the MMF sources 35, 36 also serve to complete the magnetic path—that is, to conduct the magnetic flux in circumferential directions.

Figure 29:
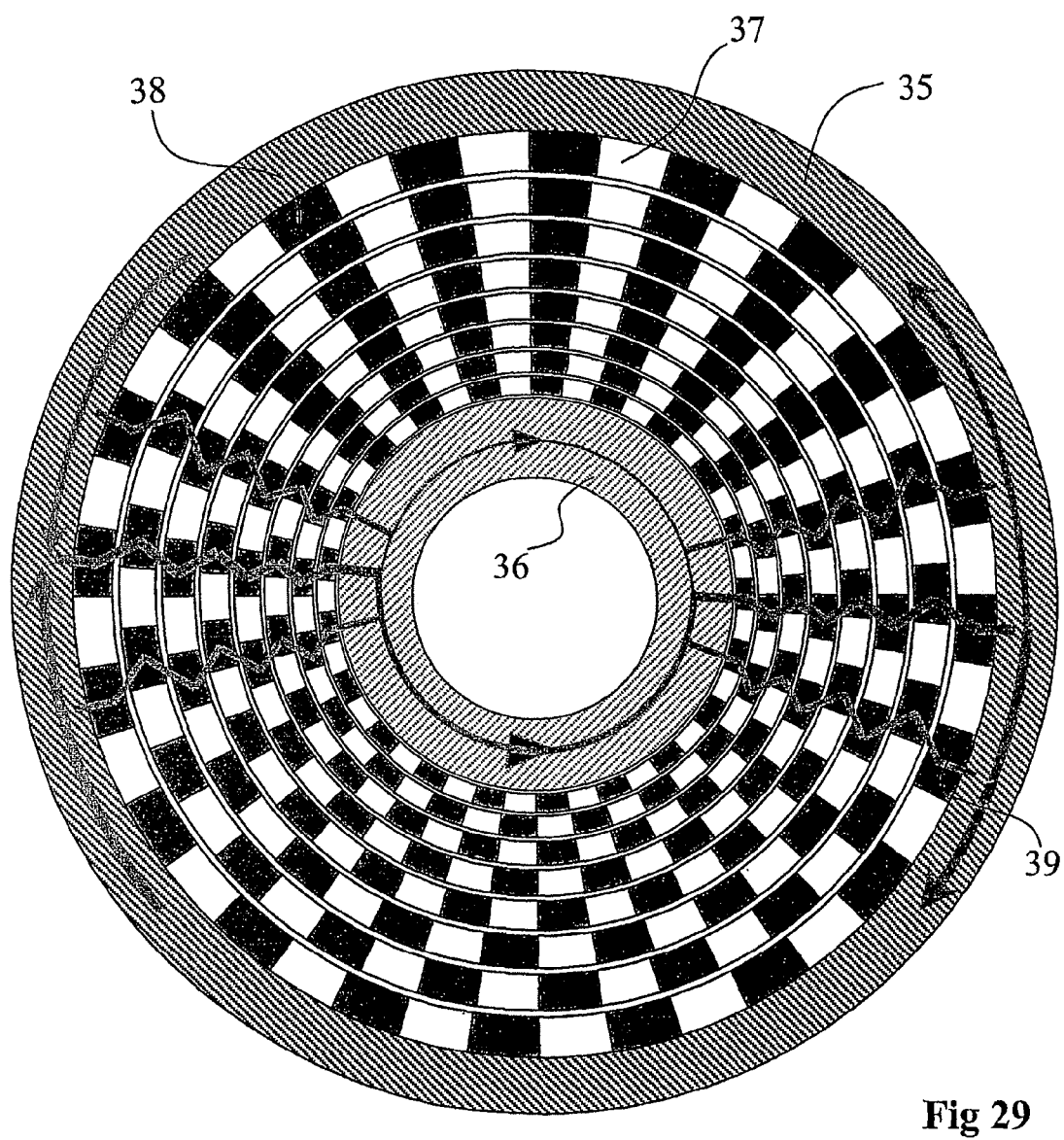
FIG. 29 is a cross-section normal to the axis of rotation of the embodiment of FIG. 28 in which some partial paths of magnetic flux shown as dashed zig-zag lines.

FIG. 29 shows a cross section—normal to the axis of rotation—through the bearing rotor, the bearing stator and the external and internal MMF sources 35, 36. A set of concentric annuli is evident with each annulus having alternating regions 37 of low relative permeability and regions 38 of high relative permeability (ferromagnetic material/composite). With the exceptions of the innermost and outermost annuli, alternating annuli in FIG. 29 belong to the bearing stator and bearing rotor respectively.

The innermost annulus represents the section through the internal MMF source 36. The outermost annulus represents the section through the external MMF source 35. Note that the detail of windings in these MMF sources is omitted for clarity in the figure. The task of designing a winding for the MMF-sources to produce a 2-pole MMF is a perfectly standard part of the design of rotating electrical machines and virtually all of the options available from the electrical machines industry are applicable in the present circumstances.

FIG. 29 also indicates some of the paths 39 taken by magnetic flux through the bearing at a given instant in time. The strong zig-zag pattern in this flux is immediately evident meaning that there will be a substantial airgap shear-stress across each individual airgap acting (in the present instance) to pull the bearing rotor down and to pull the bearing stator up. (The lines of magnetic flux effectively try to straighten out to minimise the reluctance of the magnetic path).

Evidently from FIG. 29, there is a very high reluctance preventing any significant passage of flux through the upper half of the bearing at this instant. The flux would have to cross several full regions of low permeability to pass through this area. There are some paths of moderately low reluctance through the bottom half of the bearing at this instant and some finite amount of flux will pass through this. The net amount of force between bearing rotor and bearing stator resulting from this flux in the lower half of the bearing at this instant will be small.

Figure 30:
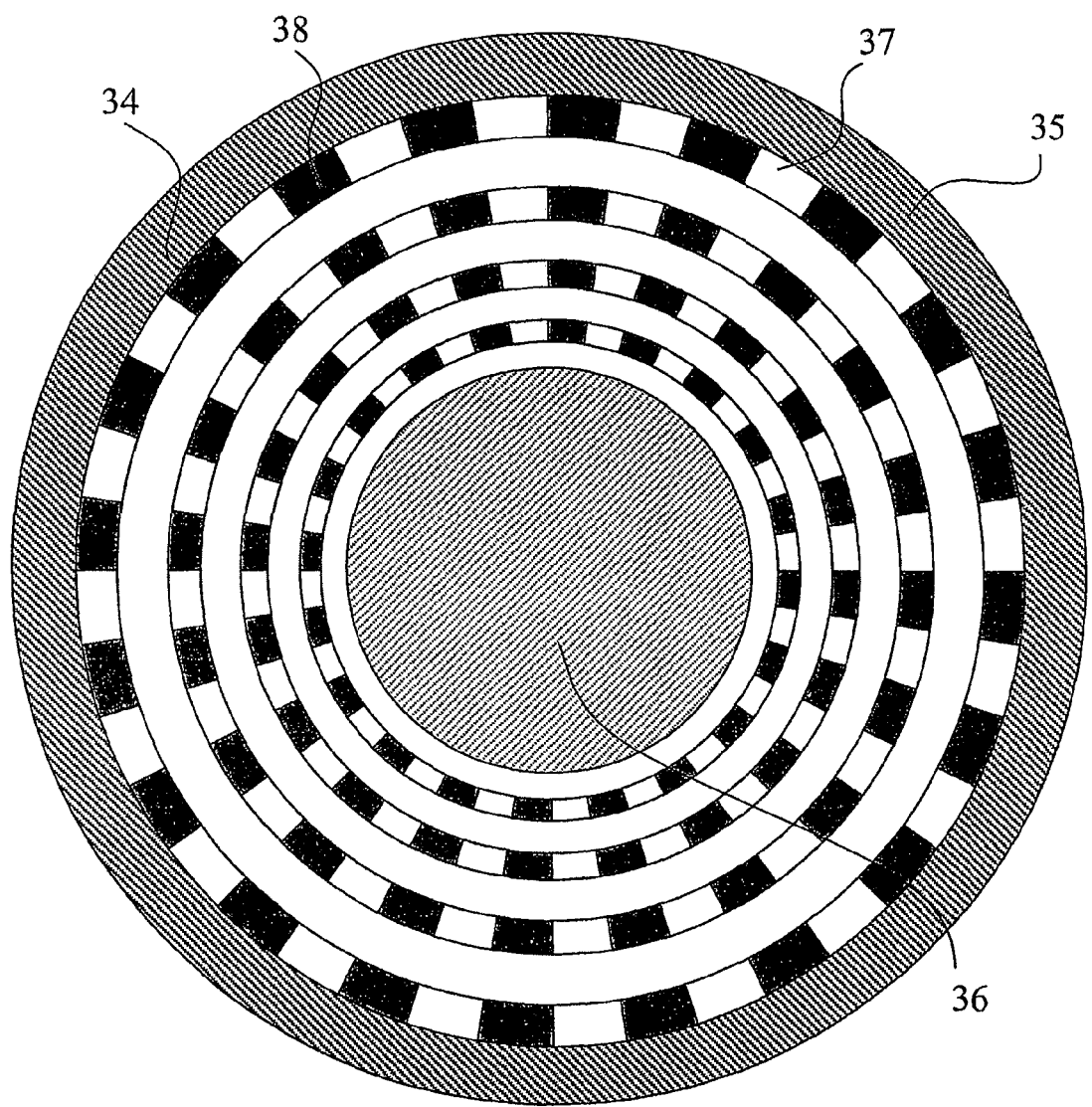
FIG. 30 is a cross-section normal to axis of rotation of the bearing-stator and MMF-sources of the embodiment of FIG. 28.
Figure 31:
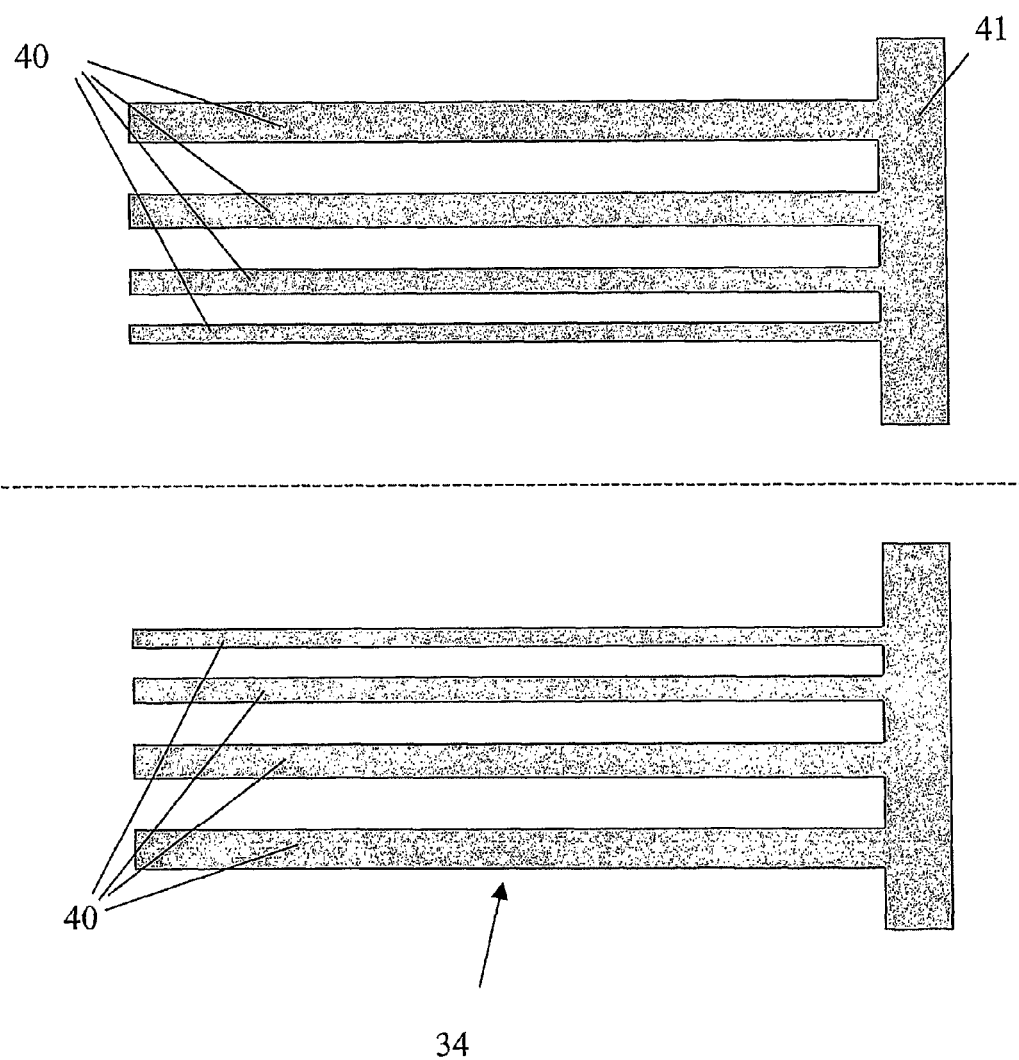
FIG. 31 is a cross-section parallel to axis of rotation of the bearing-stator of the embodiment of FIG. 28.

FIG. 30 provides a cross section through the bearing stator 34 and the two MMF sources 35,36 normal to the axis of rotation. The radial alignment of the regions of high permeability 38 on all of the stator elements is shown. FIG. 31 provides a section through the bearing stator 34 parallel to and including the axis of rotation. This shows clearly how the bearing stator comprises a number of stator cylinders 40 mounted onto a single mechanical platform 41. The mechanical platform 41 of the bearing stator 34 is made from a non-magnetic material so that it does not provide a magnetic short-circuit for the magnetic flux intended to pass through the rotor and stator elements.

Figure 32:
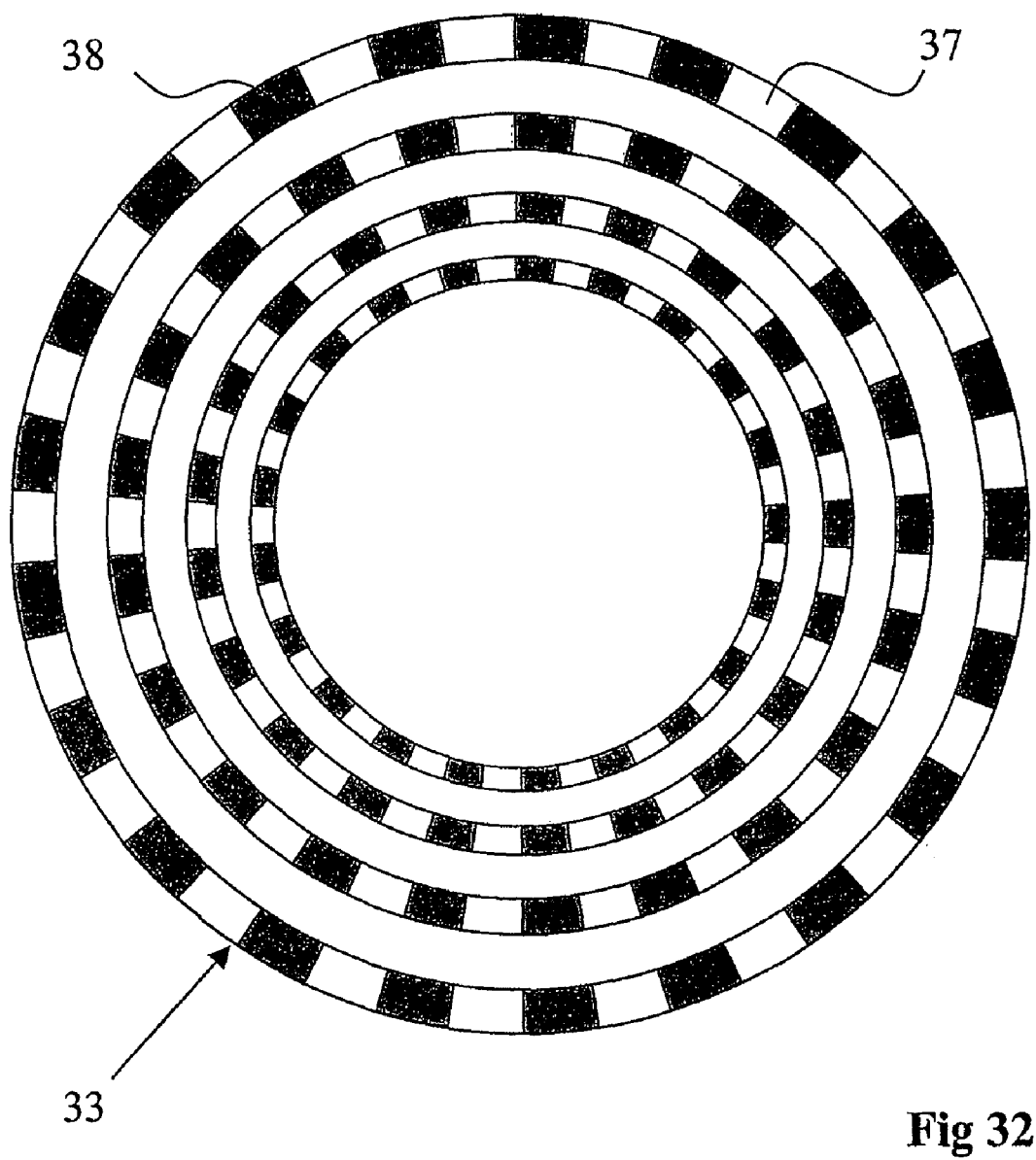
FIG. 32 is a cross-section normal to axis of rotation of the bearing-rotor of the embodiment of FIG. 28.
Figure 33:
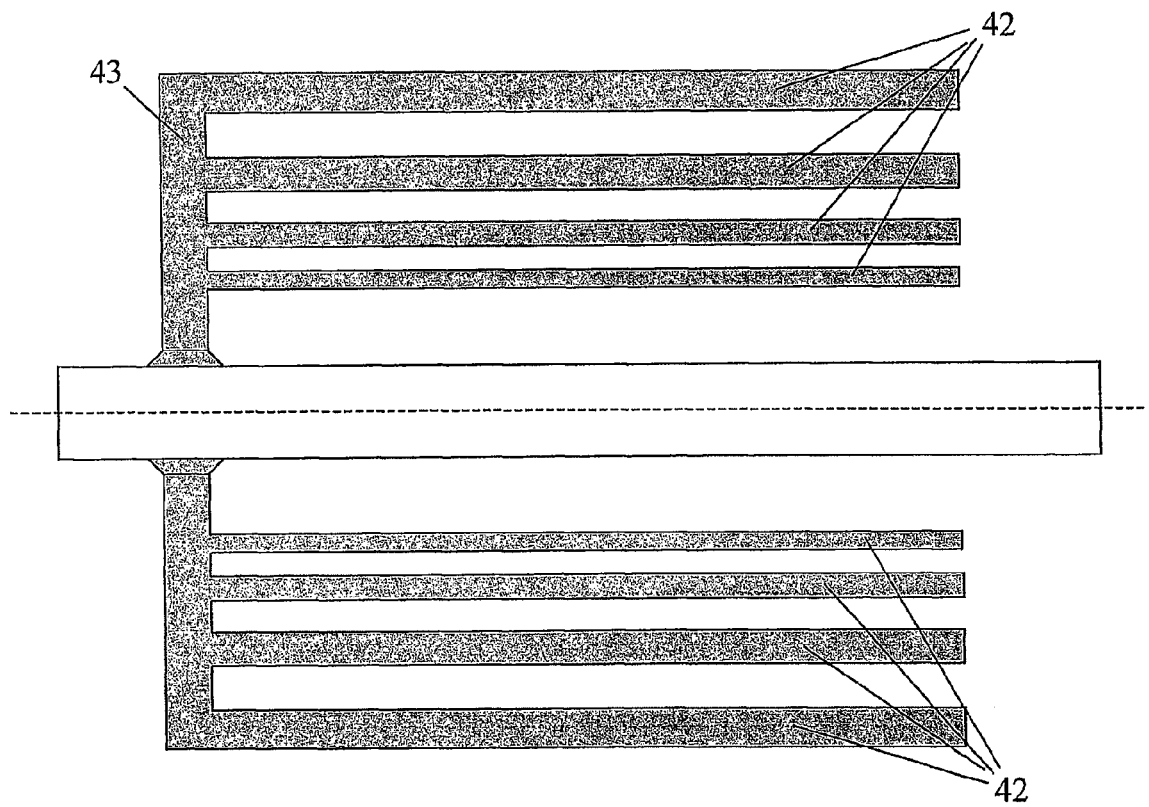
FIG. 33 is a cross-section parallel to axis of rotation of the bearing-rotor of the embodiment of FIG. 28.

FIG. 32 provides a cross section through the bearing rotor 33 normal to the axis of rotation. The radial alignment of the regions of high permeability 38 on all of the rotor elements is shown. FIG. 33 provides a section through the bearing stator 33 parallel to the axis of rotation. This shows clearly that the bearing rotor 33 comprises a number of rotor cylinders 42 mounted onto a single mechanical platform 43. This mechanical platform 43 is also made from a non-magnetic material so that it does not provide a magnetic short-circuit for the magnetic flux intended to pass through the rotor and stator elements.

The number of regions of high permeability 38 on each stator cylinder 40 is the same and these regions are spaced out at even angular increments. In general, this number is denoted $N_S$. The number of regions of high permeability 38 on each rotor cylinder 42 is the same and these regions are also spaced out at even angular increments. In general, this number is denoted $N_R$. The two numbers, $N_S$ and $N_R$ differ by 1. In the present case, $N_S=20$ and $N_R=21$.

At any given instant, there will be one direction where it is possible to generate a substantial force between bearing stator 34 and bearing rotor 33. If this direction is being viewed from the frame of the stator, this direction rotates at a frequency of $N_R$ times the speed of relative rotation of stator and rotor. If this "direction" is being viewed from the frame of the rotor, this direction rotates at a frequency of $N_S$ times the speed of relative rotation of stator and rotor. Thus, for example, if the stator of the present embodiment is stationary and the rotor is spinning at 100 cycles per second, there are 2100 individual opportunities in each second in which an impulse can be imparted to the rotor in any given direction. By varying the magnitude and direction of the applied MMF field, very strong frequency components of force can be achieved in any direction for frequencies up to 1050 Hz in this case. In the general case, the frequency limit (before aliasing) is $N_R\Omega/2$ where $\Omega$ is the shaft rotational speed.

Obviously, since this bearing operates by supplying a set of impulses in place of a steady force, there is some possibility that rotor or stator resonances might be excited. Hence careful choice of the bearing location and bearing support properties is mandatory. By correctly shaping the current waveforms in the MMF sources, the harmonic content of the net relative force above $N_R\Omega/2$ can be reduced to arbitrarily low levels.

The thickness of airgaps present between rotor and stator cylinders in the bearing obviously have a minimum value determined by the allowable transverse misalignment that the bearing is expected to accommodate. Normally the smallest airgap would be many times greater than this minimum value. The airgaps between adjacent rotor and stator cylinders in this embodiment increase with increasing radius—approximately in proportion.

FIGS. 29, 30 and 31 imply that only 7 active airgaps may be present. In an actual implementation, the number of airgaps might be substantially larger. Conceivably, in some cases there might be fewer airgaps. However in such cases, it is possible that a more conventional design of bearing would have a higher force capability.

In the above description, the internal MMF source 36 is active in providing some of the MMF to drive the magnetic flux through the rotor and stator cylinders and it is fixed in the same frame of motion as the external MMF source 35. The internal MMF source need not necessarily contribute any net MMF to the magnetic field in which case, it can be free to rotate with the rotor. The internal MMF source may comprise a simple stack of annulus-shaped laminations in these cases—serving only to conduct magnetic flux across the central portion of the bearing. Alternatively, the external MMF source may not be required to contribute any net MMF if sufficient MMF can be provided by the internal MMF source in which case the external MMF source would be free to rotate with the rotor. It could comprise a simple stack of annulus-shaped laminations in these cases—serving only to conduct magnetic flux circumferentially around the outside of the bearing.

The radial thicknesses of the rotor and stator cylinders 40, 42 are shown as being constant in FIGS. 29, 30 and 31 but in some optimised cases, these would vary along the axial length. Because bearing-force is accumulated along the length, there may sometimes be a need for the roots of the cylinders on both the rotor and the stator (near the mechanical platform in both cases) to be radially thicker than the tips.

Figure 34:
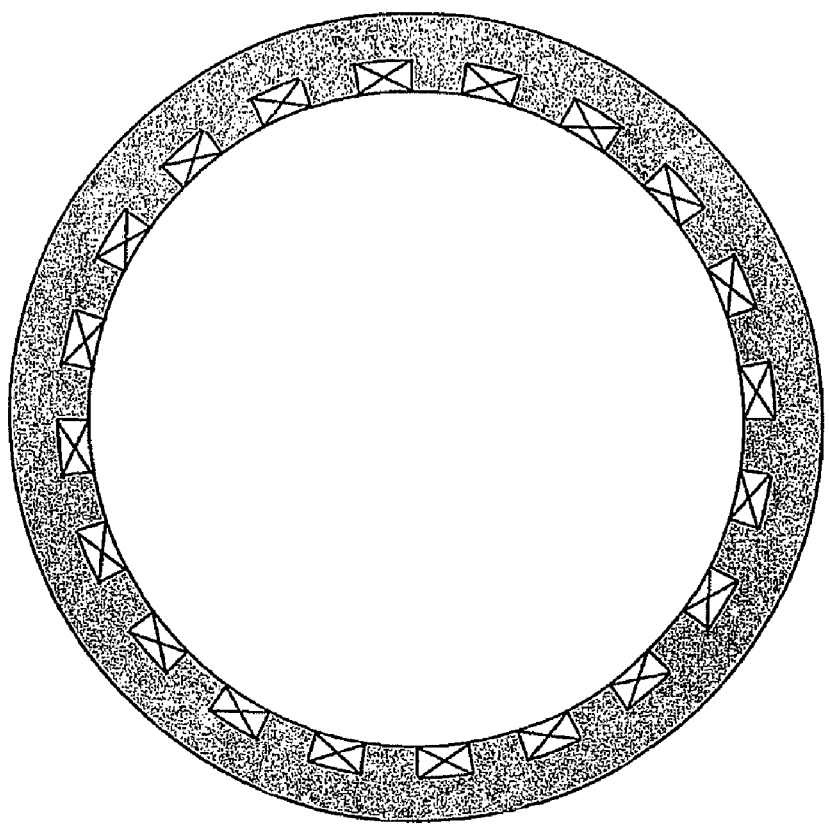
FIG. 34 is an external MMF-source integral with the outermost stator-plate bearing element of the bearing illustrated in FIG. 28.
Figure 35:
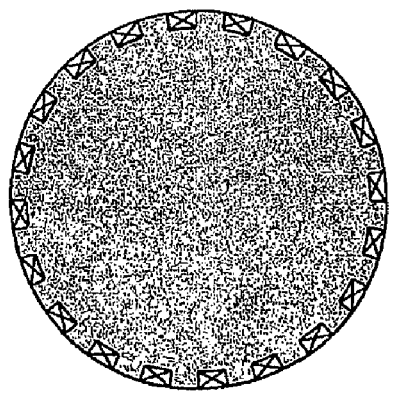
FIG. 35 is an internal MMF-source integral with the innermost stator-plate bearing element of the bearing illustrated in FIG. 28.

When the external MMF source 35 is designed to contribute a net MMF to the magnetic circuit, it is sensible to make this component integral with the outermost stator cylinder so that the regions of low permeability of this stator cylinder are occupied by windings. Similarly, when the internal MMF source 36 is designed to contribute a net MMF to the magnetic circuit, it is sensible to make this component integral with the innermost stator cylinder so that the regions of low permeability of this stator cylinder are occupied by windings. FIGS. 34 and 35 illustrate these circumstances.

Note that in FIG. 28, there is a rotor cylinder adjacent to the internal MMF source 36 and not a stator cylinder. Obviously, when the internal MMF source and the innermost stator cylinder are one integral unit, there would not be a rotor cylinder between them.

Specific Embodiment "D". An Active Radial Magnetic Bearing

FIGS. 36 to 40 show an active radial magnetic bearing according to a fourth embodiment of the present invention. The magnetic bearing comprises four main components, a bearing rotor member 50, a bearing stator member 51 and two MMF sources 52.

In the present embodiment the net direction of magnetic flux through the bearing is in the axial direction. This is in contrast to the embodiment previously described where the net direction of magnetic flux was orthogonal to the axis. In the embodiment described here, both MMF sources are identical and they are in the same frame of movement as the bearing stator.

Figure 36:
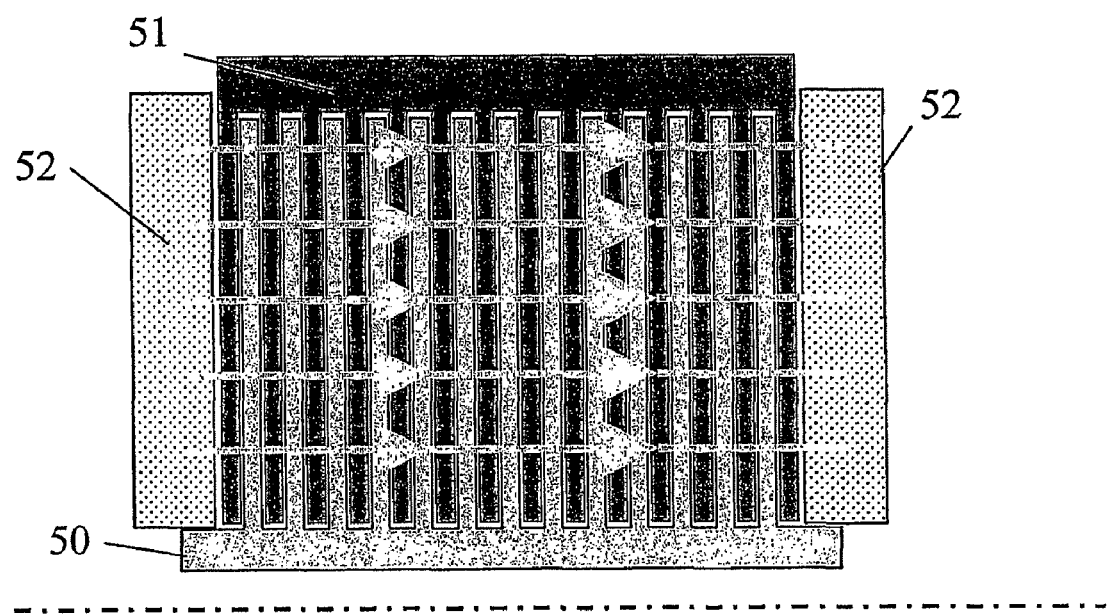
FIG. 36 is a cross-section parallel to the axis of rotation of an interleaved-discs embodiment of active radial bearing according to a fourth embodiment of the invention.

FIG. 36 shows a cross section through the bearing rotor 50, the bearing stator 51 and the two MMF sources 52. This section is taken parallel to the axis of rotation. The lines in FIG. 36 indicate the direction of flow of magnetic flux. The magnetic circuit is completed internally within the MMF sources 52. The MMF sources generate a 2-pole MMF pattern through the bearing. That is to say, magnetic flux is pushed axially along one side of the bearing and it returns along the other side.

Figure 37:
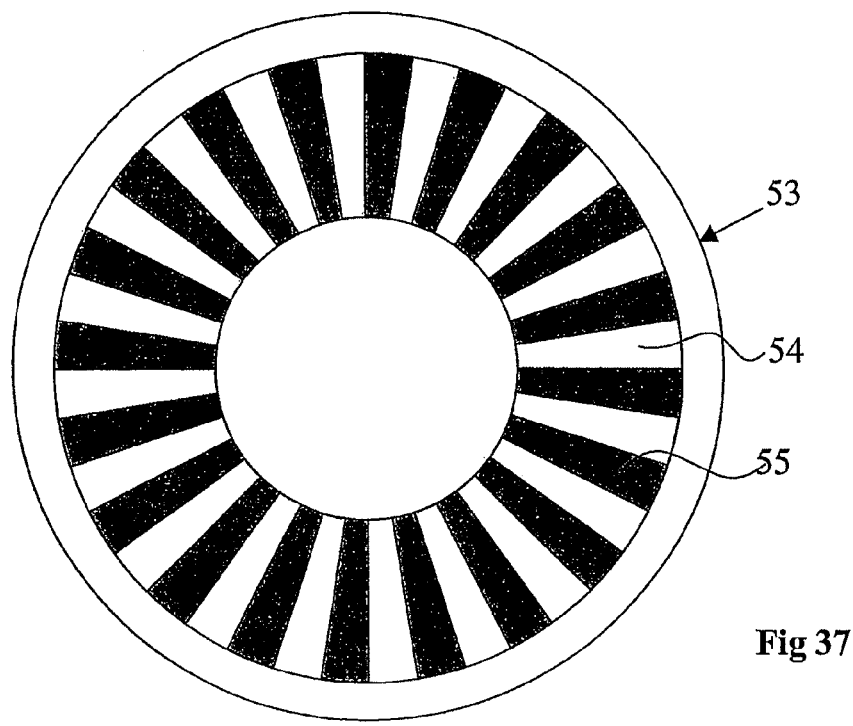
FIG. 37 is a front view of a single stator-plate bearing element from the bearing of FIG. 36.
Figure 38:
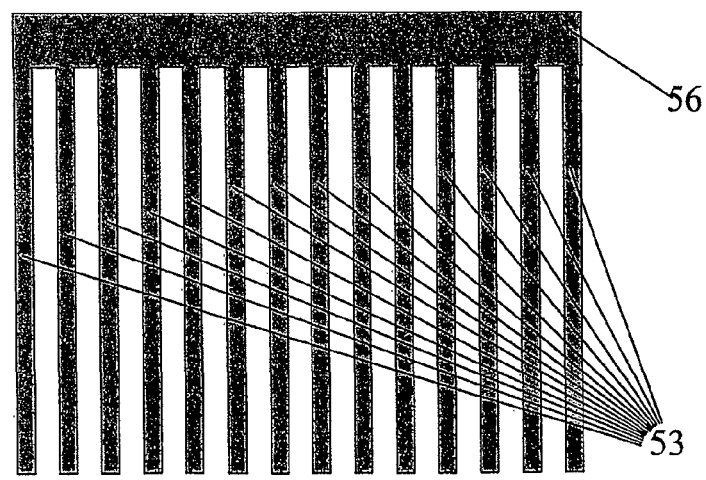
FIG. 38 is a section through the stator from the bearing of FIG. 36.

The bearing stator 51 comprises a set of stator plate bearing elements 53 (FIG. 38) whose central surfaces are parallel to each other and normal to the axis of rotation. These stator plate bearing elements 53 are disc shaped, and comprise sectors of alternating high permeability 54 and low relative permeability 55 as indicated in FIG. 37. They are mechanically joined together by a common mechanical platform 56 (FIG. 38). The mechanical platform is made from a non-magnetic material to prevent it from short-circuiting the magnetic circuit. FIG. 37 shows a single stator plate bearing element having $N_S$ (=20 in this case) sectors of high relative permeability 54.

Figure 39:
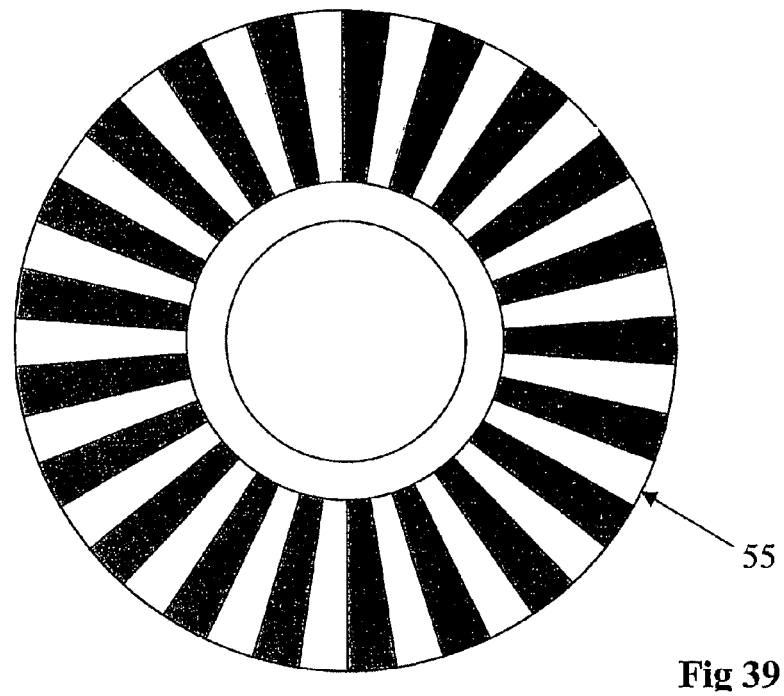
FIG. 39 is a front view of a single rotor-plate bearing element from the bearing of FIG. 36.
Figure 40:
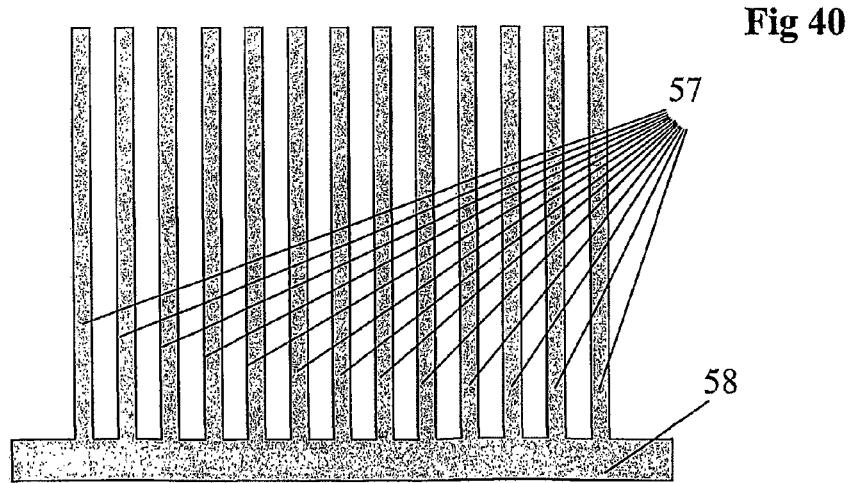
FIG. 40 is a section through the rotor from the bearing of FIG. 36.

The bearing rotor 50 comprises a set of rotor plate bearing elements 57 (FIG. 40) whose central surfaces are parallel to each other and normal to the axis of rotation. These rotor plate bearing elements 57 are disc-shaped, and comprise sectors of alternating high permeability 54 and low relative permeability 55 as indicated by FIG. 39. They are mechanically joined together by a common mechanical platform 58 (FIG. 40), which may be a sleeve to fit over a shaft or it may be the shaft of the rotor of the rotating machine itself. The mechanical platform is made from a non-magnetic material to prevent it from short-circuiting the magnetic circuit. FIG. 39 shows a single rotor plate bearing element having $N_R$ (=21 in this case) sectors of high relative permeability 54.

The principle of operation of this bearing is identical to that of the bearing described in the third embodiment above. At any given instant, there will be one direction where it is possible to generate a substantial force between stator and rotor. If this direction is being viewed from the frame of the stator, this direction rotates at a frequency of $N_R$ times the speed of relative rotation of stator and rotor. If this direction is being viewed from the frame of the rotor, this direction rotates at a frequency of $N_S$ times the speed of relative rotation of stator and rotor. Thus, for example, if the stator of the present embodiment is stationary and the rotor is spinning at 100 cycles per second, there are 2100 individual opportunities in each second in which an impulse can be imparted to the rotor in any given direction. By varying the magnitude and direction of the applied MMF field, very strong frequency components of force can be achieved in any direction for frequencies up to 1050 Hz in this case. In the general case, the frequency limit (before aliasing) is $N_R \Omega/2$ where $\Omega$ is the shaft rotational speed.

Obviously, since this bearing operates by supplying a set of impulses in place of a steady force, there is some possibility that rotor or stator resonances might be excited. Hence careful choice of the bearing location and bearing support properties is mandatory. By correctly shaping the current waveforms in the MMF sources, the harmonic content of the net relative force can be minimised.

The thickness of airgaps present between rotor and stator plate bearing elements in this embodiment of the bearing obviously has a minimum value determined by the allowable axial misalignment that the bearing is expected to accommodate. Normally the smallest airgap would be many times greater than this minimum value. The airgaps between adjacent rotor and stator plate bearing elements in this embodiment increase with increasing radius—approximately in proportion. This increase in airgap would be accommodated primarily by a corresponding decrease in the axial thickness of the rotor plate bearing elements. There may also be some variation in the axial thickness of the stator plate bearing elements with radius.

Specific Embodiment "E". An Active Radial Magnetic Bearing

FIGS. 41 to 45 describe a magnetic bearing according to a fifth embodiment of the present invention. This magnetic bearing, like those in the above embodiments, achieves a high load capacity through causing a reasonable working shear stress to exist at each one of numerous (nearly) parallel airgaps.

The bearing of this embodiment achieves the necessary obliqueness of flux within the airgaps by employing a distribution of electric currents in a layer on at least one side of each airgap. On the other side of each airgap another layer is located in which there is either another distribution of electric current or a distribution of permanent magnet material. Whether there is a current distribution or a distribution of permanent magnet material in a given layer, the net effect is nevertheless a provision of axial MMF in the layer which varies according to position within the layer.

This bearing is similar in geometry to the bearing described in the fourth embodiment above. However, the means by which magnetic flux is redirected here is quite different—being based on permanent magnets and current distributions whereas in the fourth embodiment, the redirection of magnetic flux was based on regions of high ferromagnetic permeability.

The magnetic bearing of this embodiment comprises three main components, a bearing rotor member 60, a bearing stator member 61 and two external MMF sources 62 (FIG. 41) which are again in the same frame of movement as the bearing stator.

Figure 41:
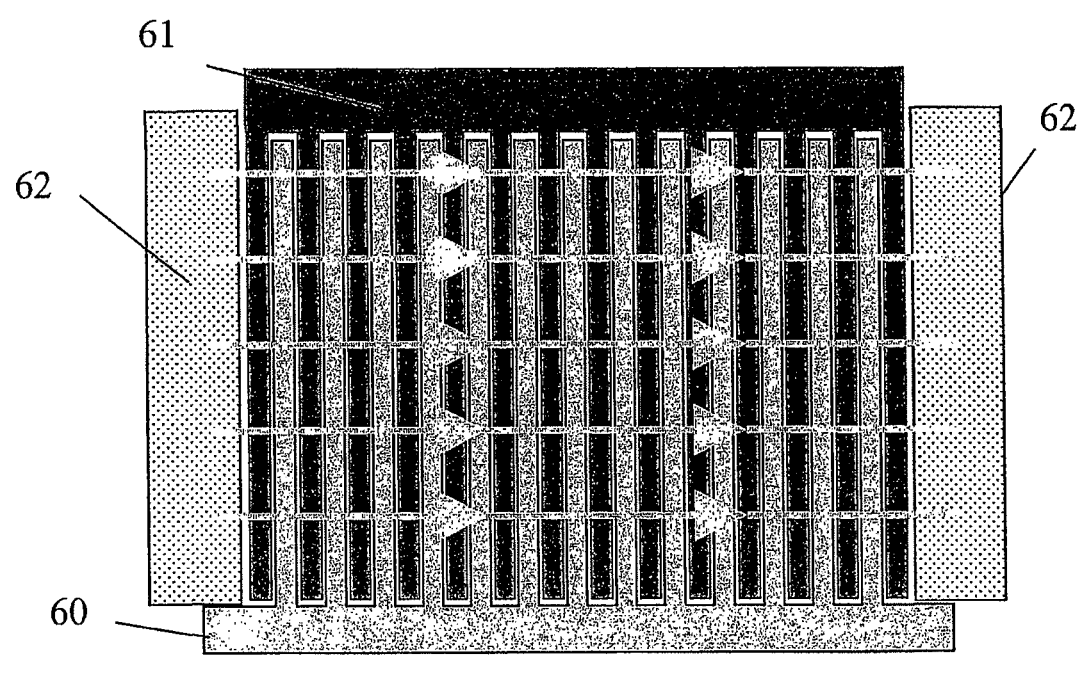
FIG. 41 is a schematic showing the principal components of an interleaved discs embodiment of active radial bearing according to a fifth embodiment of the invention.

FIG. 41 shows a cross section through the bearing rotor 60, the bearing stator 61 and the external MMF sources 62. This section is taken parallel to the axis of rotation. The net direction of flow of magnetic flux is axial as indicated in FIG. 41 using arrows. The external MMF sources 62 generate a 2-pole MMF pattern through the bearing. That is to say, given any diametral line at angle θ, the net MMF across the bearing along any such diametral line at any instant is proportional to $\cos(\theta+\phi)$ for some phase angle, $\phi$ and it is independent of position along that diametral line. The external MMF sources also serve to complete the magnetic path—that is, to conduct the magnetic flux in circumferential directions at the two ends of the bearing.

Figure 42:
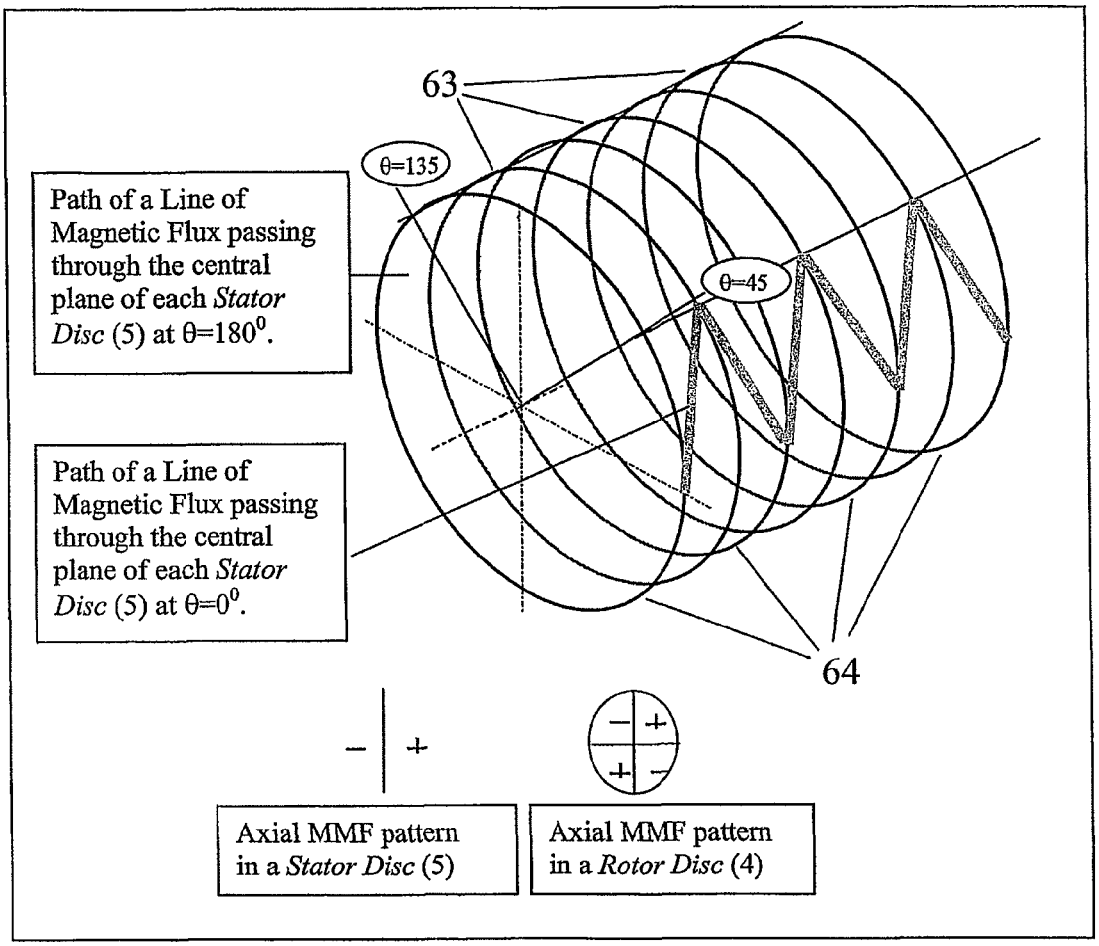
FIG. 42 is a schematic showing the principle of operation of the bearing of FIG. 41 illustrating how zig-zagging lines of flux create a good working shear stress at each inter-disc gap.

The bearing rotor 60 comprises a number of rotor discs 63 in a stack and the bearing stator 61 comprises a number of stator discs 64 in a stack (FIG. 42). The rotor discs 63 and stator discs 64 are both "layers" in the sense applied above and as such, they all have provision for axial MMF.

FIG. 42 indicates schematically how the bearing achieves a net lateral force. Lines of magnetic flux pass axially along the bearing cutting stator discs 64 and rotor discs 63 in alternation. Each individual stator disc 64 provides an axial MMF pattern varying (approximately) according to $\cos(\theta+\phi)$ where $\phi$ is a phase angle. Each individual rotor disc 63 provides an axial MMF pattern varying (approximately) according to $\cos(2\theta+\psi)$ where $\psi$ is a phase angle. In FIG. 42, $\phi$ is set to zero and $\psi$ is set to −45°.

A line of magnetic flux passing axially through the centre of a stator disc 64 at θ=0° will naturally attempt to pass through (or close to) the centre of the adjacent rotor disc 63 at θ=45° and it will return to the line θ=0° when it passes again through the centre of a stator disc 64. Similarly, a line of magnetic flux passing through the centre of a stator disc 64 at θ=180° will naturally attempt to pass through (or close to) the centre of the adjacent rotor disc 63 at θ=135° and it will return to the line θ=180° when it passes again through the centre of a stator disc 64. By symmetry, there is no net axial flux in the plane θ=±90°. If the flux pattern is viewed from the side, it is seen that all lines of magnetic flux rise to enter a rotor disc 63 and fall as the leave the other side of the rotor disc 63. This behaviour provides the requisite angle in the magnetic flux to create a substantial mean shear stress tending to pull all rotor discs downwards relative to the stator discs.

This embodiment uses distributions of permanent magnet material for the rotor discs 63 and distributions of radial current for the stator discs 64. Magnetic iron is employed to provide structural rigidity and strength without substantially impeding the axial traverse of magnetic flux. The magnetic iron does not contribute significantly to the redirection of magnetic flux in this case—unlike the previous embodiments.

Figure 43:
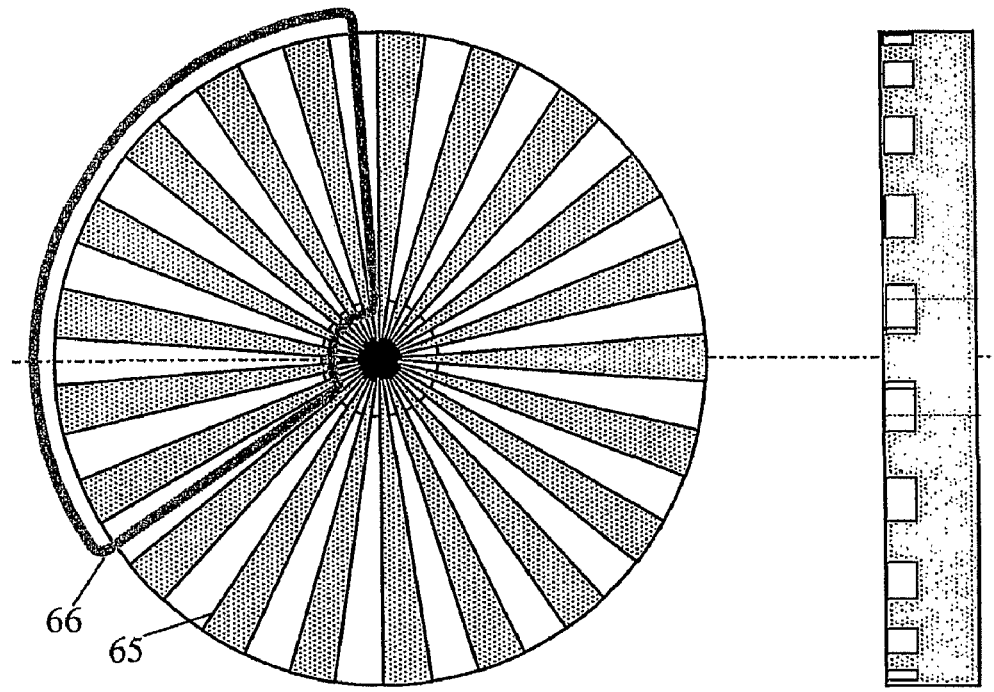
FIG. 43 are front and side views of an embodiment of MMF source for use with the bearing of FIG. 41.

The external MMF sources 62 each comprise a toothed disc 65 (FIG. 43) and a set of windings. The toothed disc is of a laminated construction comprising either a single coil of thin laminated magnetic iron wound on flat or a set of concentric thin cylinders having a very thin insulating layer between adjacent cylinders. This construction ensures that alternating magnetic flux can pass through the toothed disc 65 in axial and circumferential directions with minimal eddy-current losses. It does not matter that any magnetic flux attempting to pass in a radial direction within the toothed disc 65 incurs much more significant eddy-current losses as no such component of flux is required. FIG. 43 shows the toothed disc 65 in front and side elevations.

A single MMF source coil 66 is shown in FIG. 43 linking a number of the teeth. The number of conductors in this coil, and the thickness of insulation on those conductors are both governed by the voltage drop and current load expected on this coil. The MMF source coils 66 are series-connected into groups and these groups are connected in parallel into phases following standard practice in the construction of disc-shaped electrical machines. The set of windings on each external MMF source 62 comprises at least 2 independent phases such that a rotating 2-pole axial magnetic field can be generated. That is to say, given any straight line parallel to the axis of the magnetic bearing and located at angle, θ, and radius, r, reaching between the two external MMF sources the net MMF along that line contributed by the pair of external MMF sources is determined approximately according to cos(θ+ϕ) and it is independent of radius. In this, the angle, ϕ, is a phase angle which can be controlled to be any value between 0 and 2π depending on the values of the phase currents in the set of windings.

Figure 44:
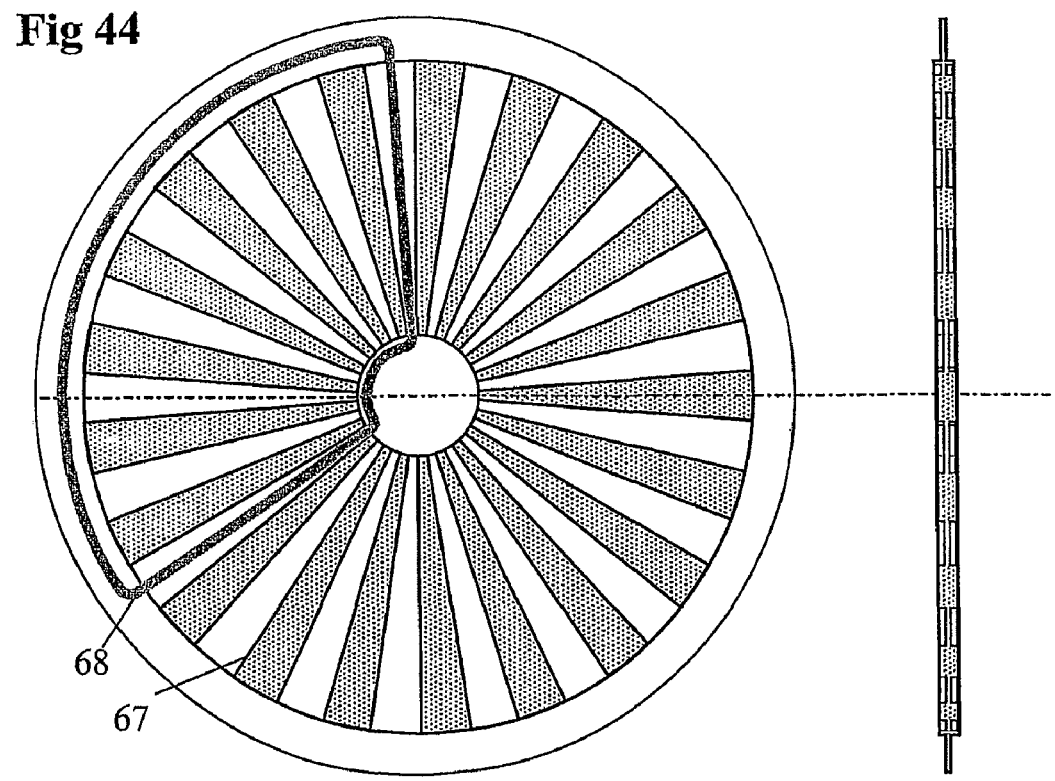
FIG. 44 is a front and side views of a single stator disc for use with the bearing of FIG. 41.

FIG. 44 shows a single stator disc 67. Each stator disc 67 carries a set of stator disc coils 68 arranged into a stator disc winding. The stator disc is relatively thin in the axial direction. Its construction is such that it allows the passage of alternating magnetic flux in the axial direction with minimal eddy-current losses. In the present embodiment, its construction is from thin laminated magnetic iron wound on flat to produce a dense spiral. The stator disc 67 has teeth machined in each side and the stator disc coils 68 are laid into these teeth with the set of stator disc coils 68 on one side of the stator disc 67 being a mirror image of the stator disc coils 68 on other side of the stator disc 67. The stator disc coils are series-connected into groups and these groups are connected in parallel into phases in a pattern identical to that used for the windings formed from the MMF source coils.

The phases of each stator disc 67 are electrically connected with the phases of the external MMF sources 62 such that when these phases are energised, the axial component of magnetic flux density is reasonably uniform with axial position along the magnetic bearing. If the entire bearing rotor 60 was magnetically inert, the magnetic flux within the bearing would be predominantly in an axial direction at almost every position and its distribution would be approximately represented by cos(θ+ϕ) where the angle, ϕ, is again a phase angle which can be controlled to be any value between 0 and 2π depending on the values of the phase currents in the set of windings.

Figure 45:
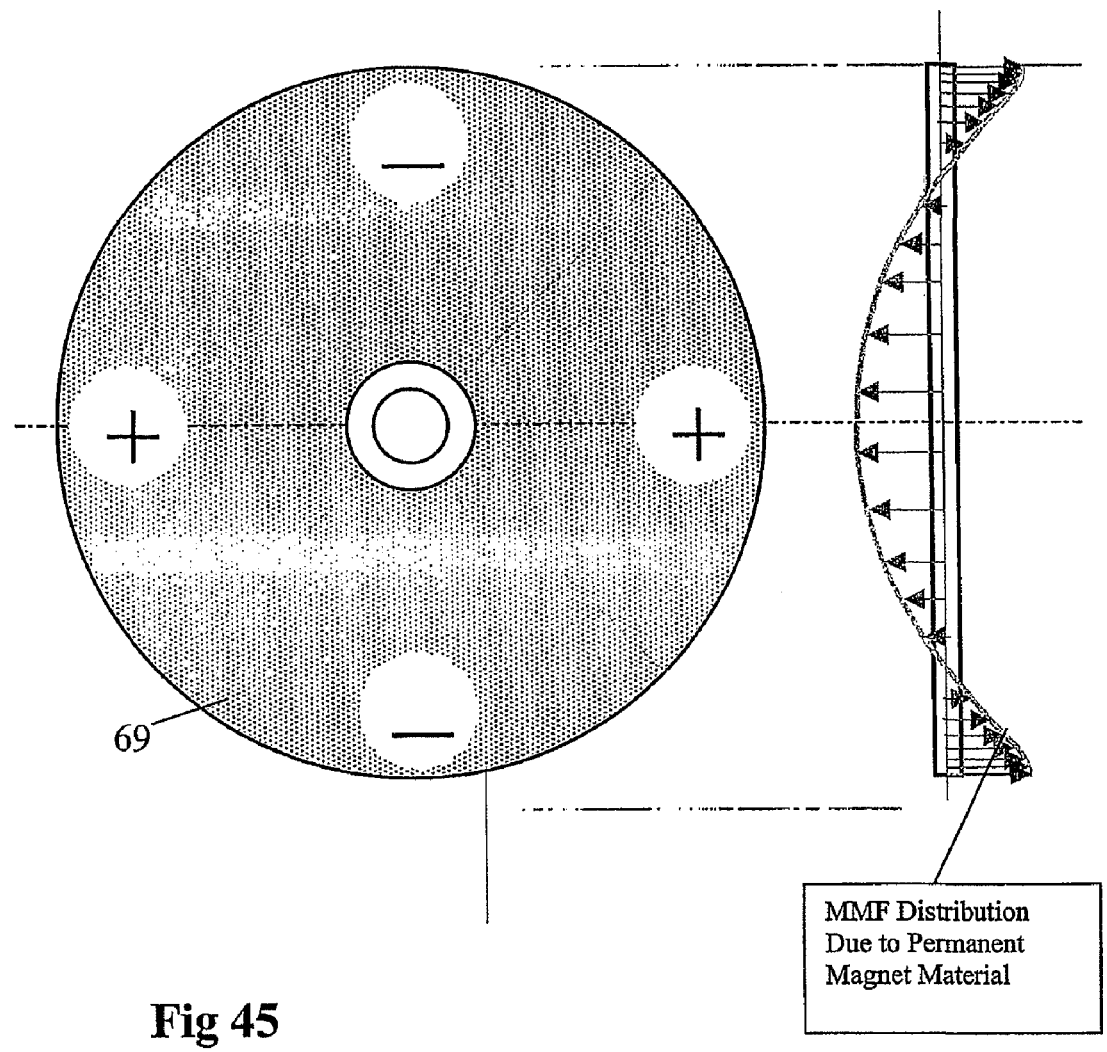
FIG. 45 is a front and side views of a single rotor disc for use with the bearing of FIG. 41 and showing its 4-pole axial magnetisation.

FIG. 45 shows a single rotor disc 69 and indicates the 4-pole pattern of axial magnetisation. In the present embodiment, the rotor disc comprises a distribution of permanent magnet material magnetised in the axial direction such that the net MMF contributed to any line of magnetic flux passing axially from one side of the rotor disc 69 to the other varies according to cos(2θ+ψ) where the angle, ψ, is some phase angle controlled by the angle of rotation of the rotor. At some reference position of the rotor, ψ=0.

At any given angular position of the rotor, it is straightforward to reason from FIG. 42 that it is possible to create forces in two orthogonal directions by energising the MMF source coils 66 and the stator disc coils 68 in an appropriate manner.

Specific Embodiment "F". A Passive Radial Magnetic Bearing

A sixth embodiment will now be described, which is identical to the fifth embodiment described above except that the requisite pattern of axial MMFs in the rotor discs 63 is generated using a set of windings in this case—in contrast to the previous embodiment in which permanent magnet material was used.

The windings on the rotor discs 63 can be very similar in form to those on the stator discs 64 except that the number of magnetic poles on the rotor discs 63 must always differ from the number of poles on the stator discs (5) by ±2. As in the previous embodiment, the preferred pole numbers are 2 poles for the stator field and 4 poles for the rotor field. One key difference between the windings on the rotor discs 63 and those on the stator discs 64 is that the distribution of axial MMF on the rotor discs need not be rotated relative to the rotor discs and hence there is not a need for two or more electrical phases on the rotor. The windings on all of the rotor discs 63 are electrically connected together so that each rotor disc produces a similar distribution of axial MMF at all times.

Both of the fifth and sixth embodiments described above presuppose that the predominant direction of working magnetic flux through the bearing will be axial and that the parallel airgaps will therefore be disc-shaped airgaps lying between rotor discs 63 and stator discs 64. In fact, it is conceptually simple to develop the same thought to a system in which the parallel airgaps are cylindrical—lying between parallel rotor and stator cylinders. The predominant direction of magnetic flux in this case would be radial and the two MMF sources would comprise one (possibly solid) cylinder inside the smallest diameter rotor cylinder and one hollow cylinder outside the largest diameter rotor cylinder. Conceptually, this change in form begins by considering that one of the external MMF sources 62 becomes conical and grows its mean diameter, the rotor discs 63 and stator discs 64 nest inside this also becoming cones and the other external MMF source.

All rotor discs 63 have the same number of magnetic poles, $N_R$, and these are in the same angular orientation for each rotor disc. Similarly, all stator discs 64 have the same number of magnetic poles, $N_S$, and these are in the same angular orientation for each stator disc and for the external MMF sources 62. In the above embodiments, $N_S=2$ and $N_R=4$. Any pair of pole numbers $\{N_S, N_R\}$ will produce the desired net lateral force provided that the following constraints are observed $$|N_R - N_S| = 2 \text{ and } N_R \cdot N_S \neq 0$$

In general, it will be attractive to use the lower pole number for the stator discs 64 for the purposes of minimising the frequency of alternating magnetic flux in the stator discs and hence minimising losses. Higher pole numbers will tend to increase the proportion of copper which is active and reduce the axial depth needed in the toothed discs 65. However, they also increase the frequency of alternation of magnetic flux for a given shaft speed and they also demand higher update rates in the active controllers.

It is required that the stator discs 64 should be able to pass alternating magnetic flux in the axial direction without substantial losses. In the above specific embodiments, it was stated that the stator discs could be constructed as rolls of steel lamination. Other construction methods are also possible including use of a powder metallurgy composite having high resistivity and the use of a composite material in comprising a large fraction of axially-oriented magnetic wire.

FIG. 41 should not be construed to imply that the internal diameter of the rotor is necessarily small. In fact, there is no limitation on the internal diameter. Large internal diameters will work well.

Specific Embodiment "G". A Linear Magnetic Bearing

Figure 46:
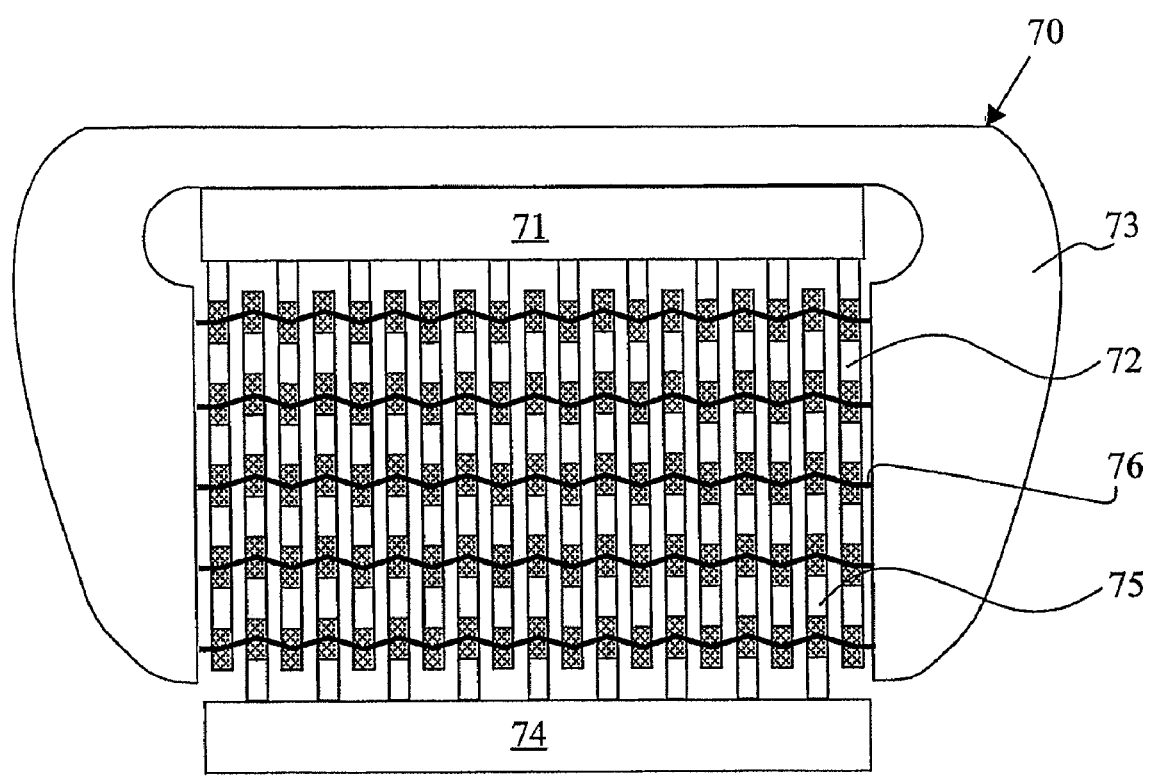
FIG. 46 is a sectional view through an embodiment of linear bearing constructed in accordance with the invention. This is the sixth embodiment described.

FIG. 46 illustrates a linear bearing in which a carriage 70 comprising a first bearing member 71 of material of low magnetic permeability carries a set of spaced rectangular plate elements 72 each formed of a plurality of alternating strips of ferro-magnetic and non-ferro-magnetic material are interleaved with spaced elongate ribbon elements 75, again formed of a plurality of alternating strips of ferro-magnetic and non-ferro-magnetic material. The spaced elongate ribbon elements 75 are carried by a second bearing member 74 of material of low magnetic permeability, and the ribbon elements 75 and the second bearing member 74 constitute a rail which supports the carriage 70.

A permanent magnet 73 forming part of the carriage 70 gives rise to magnetic flux lines 76 which cross the gaps between the interleaved elements 72, 75 in zig-zag manner and gives rise to magnetic shear stresses generating forces which support the carriage over the rail. Side to side bearing forces may be generated in another way.

It will be noted that in this embodiment, it is convenient to mount the magnet 73, the source of MMF, not on the stator, the rail 74, 75, but rather on the "rotor" i.e. the carriage 70. In general, in the case of linear bearings, it will be convenient to mount the main source of MMF on the shorter of the two bearing members.

The invention claimed is:

1. A magnetic bearing comprising:
   a first bearing member carrying a first set of bearing elements;
   a second bearing member carrying a second set of bearing elements, said first bearing elements being interleaved with said second bearing elements to define at least six substantially parallel interleaf gaps between successive first and second bearing elements;
   a magnetic flux return path; and
   a source of magneto-motive force operative to drive at least one flux line through each of said first and second bearing elements and across each interleaf gap, the magnetic circuit being completed by the magnetic return path, wherein the flux line crosses each of said interleaf gaps at an angle to the normal to the surfaces of the bearing elements that define said interleaf gap so that bearing forces are developed as a result of magnetic shear stresses acting across said gaps.

2. A magnetic bearing according to claim 1, wherein the flux line is caused to follow a zig-zag path as it passes through said interleaved bearing elements.

3. A magnetic bearing force according to claim 1, wherein substantially all of the magnetic flux generated by the source of magneto-motive force is caused to follow a zig-zag path as it passes through said interleaved bearing elements.

4. A magnetic bearing according to claim 1, wherein electrically conductive material is arranged within one or more of said interleaved bearing elements to allow flow of electric currents in order to influence a path of magnetic flux across at least one said interleaf gap.

5. A magnetic bearing according to claim 1, wherein permanent magnet material is distributed within at least one of said interleaved bearing elements in order to influence a path of magnetic flux across at least one said interleaf gap.

6. A magnetic bearing according to claim 1, wherein ferromagnetic material is distributed pattern-wise within at least one of said interleaved bearing elements such that reluctance experienced by a line of magnetic flux passing from one side of said bearing element(s) to the other side of said bearing elements is a strong function of the location of that line of magnetic flux; this dependence of reluctance on location then serving to influence a path of magnetic flux across at least one said interleaf gap.

7. A magnetic bearing according to claim 1, wherein the bearing is an active bearing.

8. A magnetic bearing according to claim 1, wherein the bearing is a passive bearing.

9. A magnetic bearing according to claim 1, wherein the bearing is constituted as a rotational bearing.

10. A magnetic bearing according to claim 1, wherein the bearing is constituted as a linear bearing.

11. A magnetic bearing according to claim 9, wherein said first and second bearing elements are annular discs mounted normal to an axis of rotation of said bearing.

12. A magnetic bearing according to claim 9, wherein said first and second bearing elements are cylinders mounted coaxially with an axis of bearing rotation of said bearing.

13. A magnetic bearing according to claim 1, wherein one said bearing member has one more interleaving element than the other.

14. A magnetic bearing according to claim 1, wherein the bearing is an active bearing and one or more of said bearing elements is a disc that carries a conductive winding arranged to allow the flow of electric current in order to influence the path of magnetic flux across at least one of the interleaf gaps.

* * * * *